(12) United States Patent
Zhou et al.

(10) Patent No.: US 12,087,010 B2
(45) Date of Patent: Sep. 10, 2024

(54) SYSTEMS AND METHODS FOR LANE DETECTION

(71) Applicant: ZHEJIANG DAHUA TECHNOLOGY CO., LTD., Zhejiang (CN)

(72) Inventors: Zhangwei Zhou, Hangzhou (CN); Qiankun Li, Hangzhou (CN); Wei Lu, Hangzhou (CN); Jun Yin, Hangzhou (CN); Xingming Zhang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 440 days.

(21) Appl. No.: 17/447,421

(22) Filed: Sep. 11, 2021

(65) Prior Publication Data

US 2021/0406561 A1   Dec. 30, 2021

Related U.S. Application Data

(63) Continuation of application No. PCT/CN2019/126329, filed on Dec. 18, 2019.

(30) Foreign Application Priority Data

Mar. 12, 2019 (CN) .......................... 201910185968.9

(51) Int. Cl.
  *G06K 9/00*  (2022.01)
  *G06F 18/214* (2023.01)
  (Continued)

(52) U.S. Cl.
  CPC .............. *G06T 7/73* (2017.01); *G06F 18/214* (2023.01); *G06N 3/045* (2023.01); *G06T 7/12* (2017.01);
  (Continued)

(58) Field of Classification Search
  None
  See application file for complete search history.

(56) References Cited

U.S. PATENT DOCUMENTS

2019/0035101 A1* 1/2019 Kwant ...................... G06T 7/12

FOREIGN PATENT DOCUMENTS

| CN | 105631680 A | 6/2016 |
|----|-------------|--------|
| CN | 106529488 A | 3/2017 |

(Continued)

OTHER PUBLICATIONS

The Extended European Search Report in European Application No. 19919466.3 mailed on Mar. 16, 2022, 12 pages.

(Continued)

*Primary Examiner* — Wei Wen Yang
(74) *Attorney, Agent, or Firm* — METIS IP LLC

(57) ABSTRACT

Systems and methods for lane detection are provided. The methods may include obtaining an image and determining, for each of a plurality of pixels in an image, a semantic category using a trained semantic segmentation network. The methods may further include determining one or more pixel sets based on the plurality of pixels according to a predetermined rule. Each of the one or more pixel sets includes one or more pixels of a same semantic category. The methods may further include, in response to a determination that there are one or more erroneous pixels in a pixel set, removing the one or more erroneous pixels from the pixel set to obtain a fitting line corresponding to a lane line. The methods may further include determining a position of the lane line based on the fitting line.

18 Claims, 16 Drawing Sheets

(51) Int. Cl.

| | |
|---|---|
| *G06N 3/045* | (2023.01) |
| *G06T 7/12* | (2017.01) |
| *G06T 7/13* | (2017.01) |
| *G06T 7/73* | (2017.01) |
| *G06V 10/764* | (2022.01) |
| *G06V 10/82* | (2022.01) |
| *G06V 20/56* | (2022.01) |
| *G06V 10/44* | (2022.01) |

(52) U.S. Cl.
CPC .............. *G06T 7/13* (2017.01); *G06V 10/764* (2022.01); *G06V 10/82* (2022.01); *G06V 20/588* (2022.01); *G06V 10/454* (2022.01)

(56) References Cited

FOREIGN PATENT DOCUMENTS

| | | | |
|---|---|---|---|
| CN | 107229908 A | 10/2017 | |
| CN | 108216229 A | 6/2018 | |
| CN | 108921089 A * | 11/2018 | |
| WO | WO-2018104563 A2 * | 6/2018 | ............. G01C 21/32 |
| WO | 2019040670 A1 | 2/2019 | |
| WO | 2020181870 A1 | 9/2020 | |

OTHER PUBLICATIONS

International Search Report in PCT/CN2019/126329 mailed on Mar. 18, 2020, 4 pages.
Written Opinion in PCT/CN2019/126329 mailed on Mar. 18, 2020, 6 pages.
First Office Action in Chinese Application No. 201910185968.9 mailed on Sep. 28, 2020, 20 pages.

* cited by examiner

SYSTEMS AND METHODS FOR LANE DETECTION

CROSS-REFERENCE TO RELATED APPLICATIONS

This application is a continuation of International Application No. PCT/CN2019/126329, filed on Dec. 18, 2019, which claims priority of Chinese Patent Application No. 201910185968.9, filed on Mar. 12, 2019, the entire contents of each of which are incorporated herein by reference.

TECHNICAL FIELD

The present disclosure generally relates to image processing, and in particular, to systems and methods for lane detection.

BACKGROUND

Lane detection technology is widely used in the fields of automatic driving, traffic surveillance, etc. In recent years, with the rapid development of deep learning, some machine learning models have been used in lane detection. For many existing lane detection methods, errors often occur in the detection. For example, objects such as railings, trees, vehicles, traffic identifiers and so on, are sometimes mistakenly identified as lanes. Many existing lane detection methods are only applied to a specific scenario but not in a varying environment (e.g., under strong light, weak light, under extreme weather). The robustness of many lane detection methods is highly questionable. Moreover, some objects, such as railings, sometimes have colors and shapes that are very similar to lane lines. These objects are often identified according to the surroundings, and thus many lane detection methods cannot be applied to the detection of lane lines with varying shapes (e.g., straight, curved, or folding). Therefore, it is desirable to provide systems and methods for detecting one or more lane lines of various shape(s) more accurately.

SUMMARY

According to an aspect of the present disclosure, a method for lane detection is provided. The method may be implemented on a computing device including at least one processor and at least one storage medium. The method may include obtaining an image and determining, for each of a plurality of pixels in the image, a semantic category using a trained semantic segmentation network. The method may further include determining one or more pixel sets based on the plurality of pixels according to a predetermined rule. Each of the one or more pixel sets includes one or more pixels of a same semantic category. The method may further include, for each of the one or more pixel sets, determining whether there are one or more erroneous pixels that satisfy a predetermined condition by performing an iterative fitting operation on the one or more pixels in the pixel set; and in response to a determination that there are one or more erroneous pixels, removing the one or more erroneous pixels from the pixel set to obtain a fitting line corresponding to a lane line. The method may further include determining a position of the lane line based on the fitting line.

In some embodiments, the determining whether there are one or more erroneous pixels that satisfy a predetermined condition may include, in each iteration, performing a fitting operation on coordinates of one or more pixels in the pixel set to obtain an estimated fitting line, and determining whether there are one or more erroneous pixels that satisfy the predetermined condition.

In some embodiments, the determining whether there are one or more erroneous pixels that satisfy the predetermined condition may include, in each iteration, for each of the one or more pixels in the pixel set, determining, based on the estimated fitting line, a fitted coordinate associated with the pixel; determining a first difference between the fitted coordinate and an actual coordinate associated with the pixel; and in response to a determination that the second difference is greater than a first threshold, determining that the pixel is an erroneous pixel.

In some embodiments, a termination criterion for the iterative fitting operation may be that for each of one or more fitting parameters of the fitting line, a second difference between the fitting parameters estimated in two consecutive iterations is less than or equal to a second threshold.

In some embodiments, the method may further include performing a binarization operation to obtain binary information of each of the plurality of pixels, and for each of the one or more pixel sets, determining, based at least on the fitting line and the binary information of the one or more pixels in the pixel set, a lane line category of the lane line.

In some embodiments, the trained semantic segmentation network may include one or more convolutional layers and one or more deconvolutional layers. The one or more convolutional layers may be configured for a depth-wise separable convolution.

According to another aspect of the present disclosure, a system for lane detection is provided. The system may include at least one storage device storing a set of instructions and at least one processor in communication with the storage device. When executing the set of instructions, the at least one processor may be directed to cause the system to obtain an image; determine, for each of a plurality of pixels in the image, a semantic category using a trained semantic segmentation network; and determine one or more pixel sets based on the plurality of pixels according to a predetermined rule. Each of the one or more pixel sets may include one or more pixels of a same semantic category. The at least one processor may be further directed to cause the system to, for each of the one or more pixel sets, determine whether there are one or more erroneous pixels that satisfy a predetermined condition by performing an iterative fitting operation on the one or more pixels in the pixel set; and in response to a determination that there are one or more erroneous pixels, remove the one or more erroneous pixels from the pixel set to obtain a fitting line corresponding to a lane line. The at least one processor may be further directed to cause the system to determine a position of the lane line based on the fitting line.

According to yet another aspect of the present disclosure, a non-transitory computer readable medium is provided. The non-transitory computer readable medium may include a set of instructions for lane detection. When executed by at least one processor, the set of instructions may direct the at least one processor to effectuate a method. The method may include obtaining an image and determining, for each of a plurality of pixels in the image, a semantic category using a trained semantic segmentation network. The method may further include determining one or more pixel sets based on the plurality of pixels according to a predetermined rule, wherein each of the one or more pixel sets may include one or more pixels of a same semantic category. The method may further include, for each of the one or more pixel sets, determining whether there are one or more erroneous pixels that satisfy a predetermined condition by performing an iterative fitting operation on the one or more pixels in the pixel set; and in response to a determination that there are one or more erroneous pixels, removing the one or more erroneous pixels from the pixel set to obtain a fitting line corresponding to a lane line. The method may further include determining a position of the lane line based on the fitting line.

According to still another aspect of the present disclosure, a method for lane detection is provided. The method may be implemented on a computing device including at least one processor and at least one storage medium. The method may include obtaining an image, determining, for each of a plurality of pixels in the image, a semantic category using a trained semantic segmentation network. The method may further include determining one or more pixel sets based on the plurality of pixels according to a predetermined rule. Each of the one or more pixel sets may include one or more pixels of a same semantic category. The method may further include performing a binarization operation to obtain binary information of each of the plurality of pixels. For each of the one or more pixel sets, the method may further include performing a fitting operation on the one or more pixels in the pixel set to obtain a fitting line corresponding to a lane line; determining a position of the lane line based on the fitting line; and determining, based at least on the fitting line and the binary information of the one or more pixels in the pixel set, a lane line category of the lane line.

In some embodiments, the performing a binarization operation to obtain binary information of each of the plurality of pixels may include performing an edge extraction operation on the plurality of pixels in the image to obtain edge information associated with each of the plurality of pixels, and determining, based on the edge information, the binary information of each of the plurality of pixels.

In some embodiments, the determining, based on the fitting line and the binary information of the one or more pixels in the pixel set, a lane line category of the lane line may include determining, for each of the one or more pixels in the pixel set, a searching range for the pixel; determining a reference number count of reference pixels, wherein there are no edge pixels near each of the reference pixels within the searching range; and determining the lane line category of the lane line by comparing the reference number count of pixels and a count threshold.

In some embodiments, the determining the lane line category of the lane line by comparing the reference number count of pixels and a count threshold may include in response to a determination that the reference number count of reference pixels is greater than the count threshold, determining that the lane line category of the lane line is a dashed line; and in response to a determination that the reference number count of pixels is less than or equal to the count threshold, determining that the lane line category of the lane line is a solid line.

In some embodiments, the determining a searching range for the pixel may include determining a fitted coordinate of the pixel, and determining a searching range based on the fitted coordinate and a lane line width.

In some embodiments, the method may further include determining whether there are at least two pixel sets of the same semantic category in the one or more pixel sets; and in response to a determination that there are at least two pixel sets of the same semantic category in the one or more pixel sets, determining a difference between fitting parameters of the at least two pixel sets. The method may further include comparing the difference with a parameter difference threshold, and in response to a determination that the difference is less than or equal to the parameter difference threshold, generating a combined pixel set based on the at least two pixel sets.

In some embodiments, the fitting operation may be an iterative fitting operation. The method may further include, for each of the one or more pixel sets, determining whether there are one or more erroneous pixels that satisfy a predetermined condition. In response to a determination that there are one or more erroneous pixels, removing the one or more erroneous pixels from the pixel set to obtain the fitting line.

In some embodiments, the trained semantic segmentation network may include one or more convolutional layers and one or more deconvolutional layers. The one or more convolutional layers may be configured for a depth-wise separable convolution.

According to yet another aspect of the present disclosure, a system for lane detection is provided. The system may include at least one storage device storing a set of instructions and at least one processor in communication with the storage device. When executing the set of instructions, the at least one processor may be directed to cause the system to obtain an image and determine, for each of a plurality of pixels in the image, a semantic category using a trained semantic segmentation network. The at least one processor may be further directed to cause the system to determine one or more pixel sets based on the plurality of pixels according to a predetermined rule and perform a binarization operation to obtain binary information of each of the plurality of pixels. Each of the one or more pixel sets may include one or more pixels of a same semantic category. The at least one processor may be further directed to cause the system to, for each of the one or more pixel sets, perform a fitting operation on the one or more pixels in the pixel set to obtain a fitting line corresponding to a lane line; determine a position of the lane line based on the fitting line; and determine, based at least on the fitting line and the binary information of the one or more pixels in the pixel set, a lane line category of the lane line.

According to still another aspect of the present disclosure, a non-transitory computer readable medium is provided. The non-transitory computer readable medium may include a set of instructions for lane detection. When executed by at least one processor, the set of instructions may direct the at least one processor to effectuate a method. The method may include obtaining an image, determining, for each of a plurality of pixels in the image, a semantic category using a trained semantic segmentation network. The method may further include determining one or more pixel sets based on the plurality of pixels according to a predetermined rule. Each of the one or more pixel sets may include one or more pixels of a same semantic category. The method may further include performing a binarization operation to obtain binary information of each of the plurality of pixels. For each of the one or more pixel sets, the method may further include performing a fitting operation on the one or more pixels in the pixel set to obtain a fitting line corresponding to a lane line; determining a position of the lane line based on the fitting line; and determining, based at least on the fitting line and the binary information of the one or more pixels in the pixel set, a lane line category of the lane line.

According to yet another aspect of the present disclosure, a method for lane detection is provided. The method may be implemented on a computing device including at least one processor and at least one storage medium. The method may include obtaining an image and determining, for each of a plurality of pixels in the image, a semantic category using a trained semantic segmentation network. The trained semantic segmentation network include one or more convolutional layers and one or more deconvolutional layers, the one or more convolutional layers being configured for a depth-wise separable convolution. The method may further include determining one or more pixel sets based on the plurality of pixels according to a predetermined rule. Each of the one or more pixel sets may include one or more pixels of a same semantic category. The method may further include, for each of the one or more pixel sets, performing a fitting operation on the one or more pixels in the pixel set to obtain a fitting line corresponding to a lane line, and determining a position of the lane line based on the fitting line.

In some embodiments, at least a portion of the one or more convolutional layers and at least a portion of the one or more deconvolutional layers may be connected via skip connections.

In some embodiments, the trained semantic segmentation network may be constructed based on a Mobilenet and a fully convolutional network (FCN).

In some embodiments, the predetermined rule may include, for each of the plurality of pixels in the image, determining whether there are one or more reference pixel sets that have the same semantic category as the pixel; in response to a determination that there are no reference pixel sets that have the same semantic category as the pixel, generating a new reference pixel set and adding the pixel into the new reference pixel set; in response to a determination that there are one or more reference pixel sets that have the same semantic category as the pixel, determining, a minimum distance from one or more distances between the pixel and the one or more reference pixel sets; and comparing the minimum distance with a distance threshold; in response to a determination that the minimum distance is less than the distance threshold, adding the pixel into a reference pixel set corresponding to the minimum distance; and in response to a determination that the minimum distance is greater than or equal to the distance threshold, generating a new reference pixel set and adding the pixel into the new reference pixel set.

In some embodiments, the fitting operation is an iterative fitting operation. The method may further include, for each of the one or more pixel sets, determining whether there are one or more erroneous pixels that satisfy a predetermined condition. The method may further include, in response to a determination that there are one or more erroneous pixels, removing the one or more erroneous pixels from the pixel set to obtain the fitting line.

In some embodiments, the method may further include performing a binarization operation to obtain binary information of each of the plurality of pixels, and for each of the one or more pixel sets, determining, based at least on the fitting line and the binary information of the one or more pixels in the pixel set, a lane line category of the lane line.

According to still another aspect of the present disclosure, another system for lane detection is provided. The system may include at least one storage device storing a set of instructions and at least one processor in communication with the storage device. When executing the set of instructions, the at least one processor may be directed to cause the system to obtain an image and determine, for each of a plurality of pixels in the image, a semantic category using a trained semantic segmentation network, wherein the trained semantic segmentation network include one or more convolutional layers and one or more deconvolutional layers, the one or more convolutional layers being configured for a depth-wise separable convolution. The at least one processor may be further directed to cause the system to determine one or more pixel sets based on the plurality of pixels according to a predetermined rule. Each of the one or more pixel sets may include one or more pixels of a same semantic category. The at least one processor may be further directed to cause the system to, for each of the one or more pixel sets, perform a fitting operation on the one or more pixels in the pixel set to obtain a fitting line corresponding to a lane line; and determine a position of the lane line based on the fitting line.

According to still another aspect of the present disclosure, a non-transitory computer readable medium is provided. The non-transitory computer readable medium may include a set of instructions for lane detection. When executed by at least one processor, the set of instructions may direct the at least one processor to effectuate a method. The method may include obtaining an image; determining, for each of a plurality of pixels in the image, a semantic category using a trained semantic segmentation network. The trained semantic segmentation network may include one or more convolutional layers and one or more deconvolutional layers. The one or more convolutional layers may be configured for a depth-wise separable convolution. The method may further include determining one or more pixel sets based on the plurality of pixels according to a predetermined rule. Each of the one or more pixel sets may include one or more pixels of a same semantic category. The method may further include, for each of the one or more pixel sets, performing a fitting operation on the one or more pixels in the pixel set to obtain a fitting line corresponding to a lane line, and determining a position of the lane line based on the fitting line.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expressions if they may achieve the same purpose.

Figure 2:
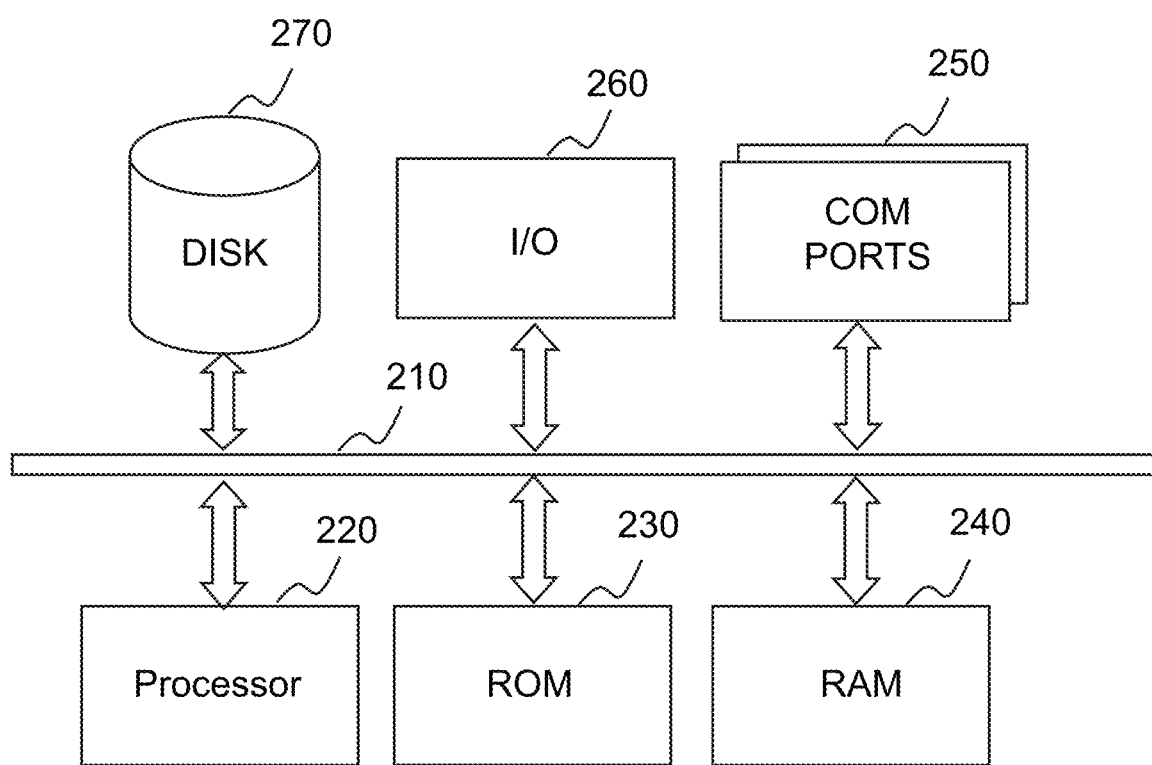
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks) but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used to distinguish the purpose of description, and cannot be interpreted as indicating or implying relative importance, nor can be understood as indicating or implying the order.

An aspect of the present disclosure relates to systems and/or methods for lane detection. As used herein, the term "lane detection" refers to the detection of one or more lanes on a road. The one or more lanes may be detected by identifying one or more lane lines corresponding to the one or more lanes. Thus, a system or method for lane detection may also be referred to as a system or method for lane line detection. An image associated with a scene on the road (also referred to as a "road image) may be obtained. To determine a lane, one or more lane lines may be identified from the road image. A trained semantic segmentation network may be used to determine a semantic category of each of a plurality of pixels in the road image. For example, the semantic segmentation network may be constructed based on a Mibilenet and a fully connected network (FCN). A portion of convolutional layers and a portion of the deconvolutional layers of the semantic segmentation network may be connected via skip connections, and thus more information of the road image (e.g., the edge) may be retained. Then one or more pixel sets may be determined based on the plurality of pixels according to a predetermined rule. Each of the one or more pixel sets may correspond to the semantic category. For each of the one or more pixel sets, the processing engine 112 may perform a fitting operation to obtain a fitting line corresponding to the lane line. In some embodiments, the fitting operation may be an iterative fitting operation that includes a plurality of iterations. In each iteration, it may be determined whether there are one or more erroneous pixels. In response to a determination that there are one or more erroneous pixels, the one or more erroneous pixels may be removed. The removal of the erroneous pixels may increase the accuracy of the fitting line corresponding to a lane line, and thus the position of the lane line may be more accurately determined.

In some cases, the lane line category (e.g., a dashed line, a solid line, a straight line, or a curved line) of the lane line may be determined by the trained semantic segmentation network. In some cases, a binarization operation may be performed on the road image to obtain binary information based on edge information of each of the plurality of pixels in the road image. The lane line category may be determined based on the binary information of each of the plurality of pixels in the road image. In some cases, an error in the lane line category determined by the trained semantic segmentation network may be corrected. For example, if two pixel sets of the same semantic category have similar fitting parameters, the two pixel sets may correspond to the same lane line, and thus the two pixel sets may be combined to obtain a combined pixel set. The semantic category of the combined pixel set may be determined based on the binary information of each pixel in the combined pixel set. Therefore, the accuracy of determining the lane lines may be improved.

Figure 1:
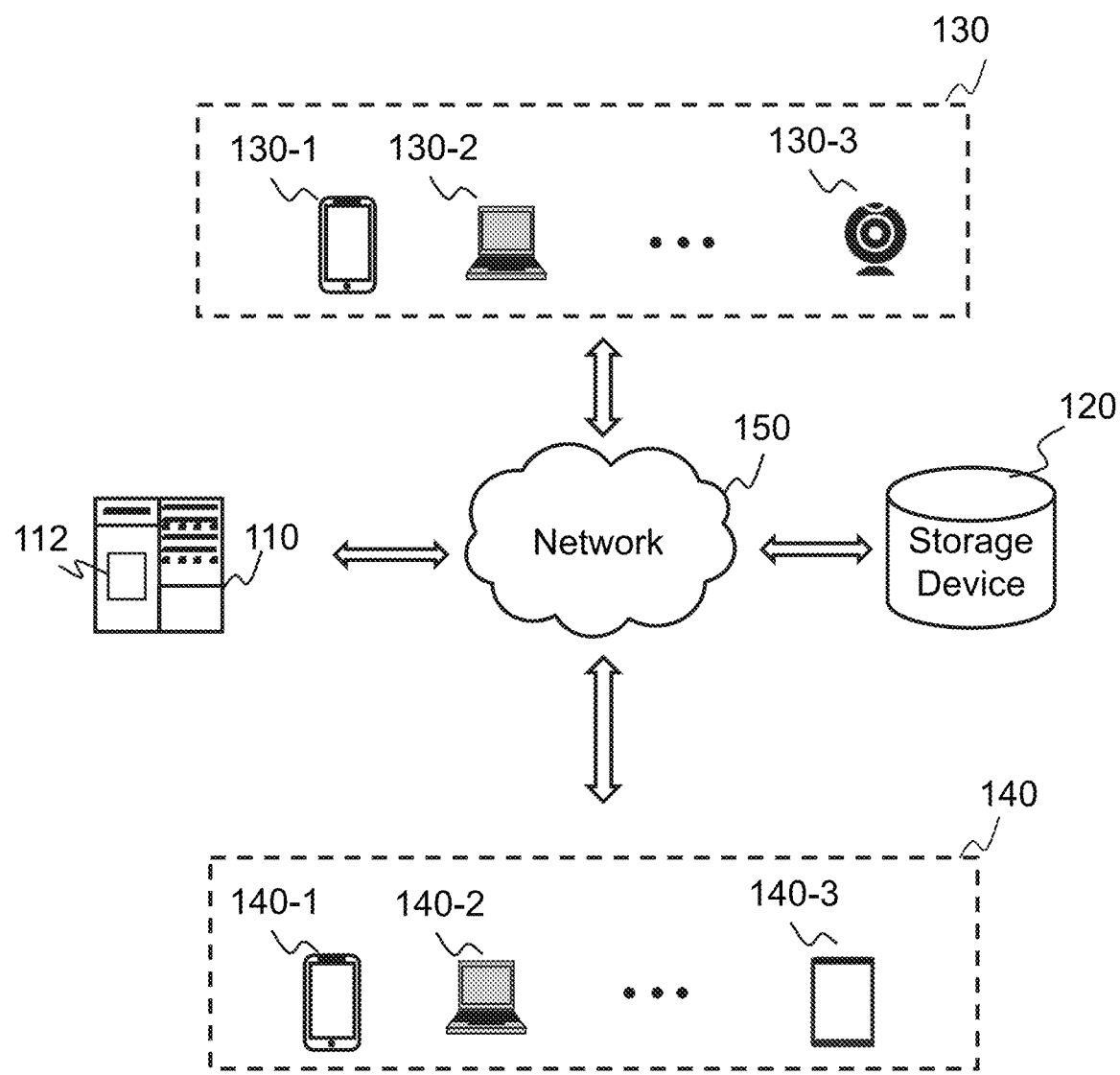
FIG. 1 is a schematic diagram illustrating an exemplary image processing system according to some embodiments of the present disclosure.

FIG. 1 is a schematic diagram illustrating an exemplary system for image processing according to some embodiments of the present disclosure. As shown, the system 100 may include a server 110, a storage device 120, an acquisition device 130, a user terminal 140, and a network 150.

The server 110 may process information and/or data relating to the system 100 to perform one or more functions described in the present disclosure. In some embodiments, the server 110 may include one or more processing engines 112 (e.g., single-core processing engine(s) or multi-core processor(s)). In some embodiments, the processing engine 112 may be configured to detect one or more lanes in a road image by determining one or more lane lines in the road image. In some embodiments, the processing engine 112 may determine the semantic category of each of a plurality of pixels in the road image. The processing engine 112 may further determine one or more pixel sets based on the plurality of pixels according to a predetermined rule. For each of the one or more pixel sets, the processing engine 112 may perform a fitting operation to obtain a fitting line corresponding to the lane line. Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The server 110 may be a single server or a server group. The server group may be centralized, or distributed (e.g., server 110 may be a distributed system). In some embodiments, the server 110 may be local or remote. For example, the server 110 may access information and/or data stored in the acquisition device 130, and/or the storage device 120 via the network 150. As another example, the server 110 may be directly connected to the acquisition device 130, and/or the storage device 120 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 of the present disclosure.

The storage device 120 may store data and/or instructions. The data and/or instructions may be obtained from, for example, the server 110, the acquisition device 130, and/or any other component of the system 100.

In some embodiments, the storage device 120 may store data and/or instructions that the server 110 may execute or use to perform exemplary methods described in the present disclosure. For example, the storage device 120 may store an image to be processed. As another example, the storage device 120 may store a trained semantic segmentation network. As another example, the storage device 120 may store an adjusted image generated after processing. In some embodiments, the storage device 120 may include a mass storage, a removable storage, a volatile read-and-write memory, a read-only memory (ROM), or the like, or any combination thereof. Exemplary mass storage may include a magnetic disk, an optical disk, solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 120 may be connected to the network 150 to communicate with one or more components of the system 100 (e.g., the server 110, the acquisition device 130). One or more components of the system 100 may access the data or instructions stored in the storage device 120 via the network 150. In some embodiments, the storage device 120 may be directly connected to or communicate with one or more components of the system 100 (e.g., the server 110, the acquisition device 130). In some embodiments, the storage device 120 may be part of another component of the system 100, such as the server 110, the acquisition device 130, or the user terminal 140.

In some embodiments, one or more components of the system 100 (e.g., the server 110, the acquisition device 130) may have permission to access the storage device 120. For example, the server 110 or the user terminal 140 may obtain the image to be processed from the storage device 120.

The acquisition device 130 may be and/or include any suitable device that is capable of acquiring an image. In some embodiments, the acquisition device 130 may include a mobile phone 130-1, a computer 130-2, a surveillance camera 130-3, etc. The computer 130-2 may include but not limited to a laptop, a tablet computer, a desktop, or the like, or any combination thereof. The surveillance camera 130-3 may include but not limited to a gun camera, a dome camera, an integrated camera, a monocular camera, a binocular camera, a multi-view camera, or the like, or any combination thereof. The image acquired by the acquisition device 130 may be a single image or a frame of a video. In some embodiments, the acquisition device 130 may include a plurality of components each of which can acquire an image. For example, the acquisition device 130 may include a plurality of sub-cameras that can take pictures or videos simultaneously.

The user terminal 140 may be associated with a user. Exemplary terminal devices 140 may include a mobile phone 140-1, a computer 140-2, a tablet computer 140-3, or the like. In some embodiments, the user terminal 140 may be and/or include any suitable device that can display or output information in a human-readable form, such as text, image, audio, video, graph, animation, or the like, or any combination thereof. In some embodiments, the user may view information and/or input data and/or instructions via the user terminal 140. For example, the user may view the road image on a display device of the user terminal 140. As another example, the user may input an instruction to start lane detection via the user terminal 140. The display device of the user terminal 140 may include a cathode ray tube (CRT) display, a liquid crystal display (LCD), a light emitting diode (LED) display, a plasma display panel (PDP), a 3D display, or the like. In some embodiments, the user terminal 140 may be connected to one or more components of the system 100 (e.g., the server 110, the storage device 120, the acquisition device 130) via the network 150, such as a wireless network or a wired network (e.g., a coaxial cable network).

The network 150 may include any suitable network that can facilitate the exchange of information and/or data for the system 100. In some embodiments, one or more components in the system 100 (e.g., the server 110, the storage device 120, and the acquisition device 130) may send information and/or data to another component(s) in the system 100 via the network 150. For example, the server 110 may obtain/acquire images from the acquisition device 130 via the network 150. In some embodiments, the network 150 may be any type of wired or wireless network, or combination thereof. Merely by way of example, the network 150 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. For example, the processing engine 112 may be integrated into the user terminal 140. However, those variations and modifications do not depart from the scope of the present disclosure.

FIG. 2 is a schematic diagram illustrating exemplary hardware and/or software components of an exemplary computing device according to some embodiments of the present disclosure. In some embodiments, the server 110 may be implemented on the computing device 200 shown in FIG. 2. For example, the processing engine 112 may be implemented on the computing device 200 and configured to perform functions of the processing engine 112 disclosed in this disclosure.

The computing device 200 may be used to implement any component of the system 100 as described herein. For example, the processing engine 112 may be implemented on the computing device 200, via its hardware, software program, firmware, or a combination thereof. Although only one such computer is shown, for convenience, the computer functions relating to image processing as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may further include program storage and data storage of different forms including, for example, a disk 270, and a read-only memory (ROM) 230, or a random-access memory (RAM) 240, for various data files to be processed and/or transmitted by the computing device. The exemplary computing device may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computer and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B or the first and second processors jointly execute steps A and B).

Figure 3:
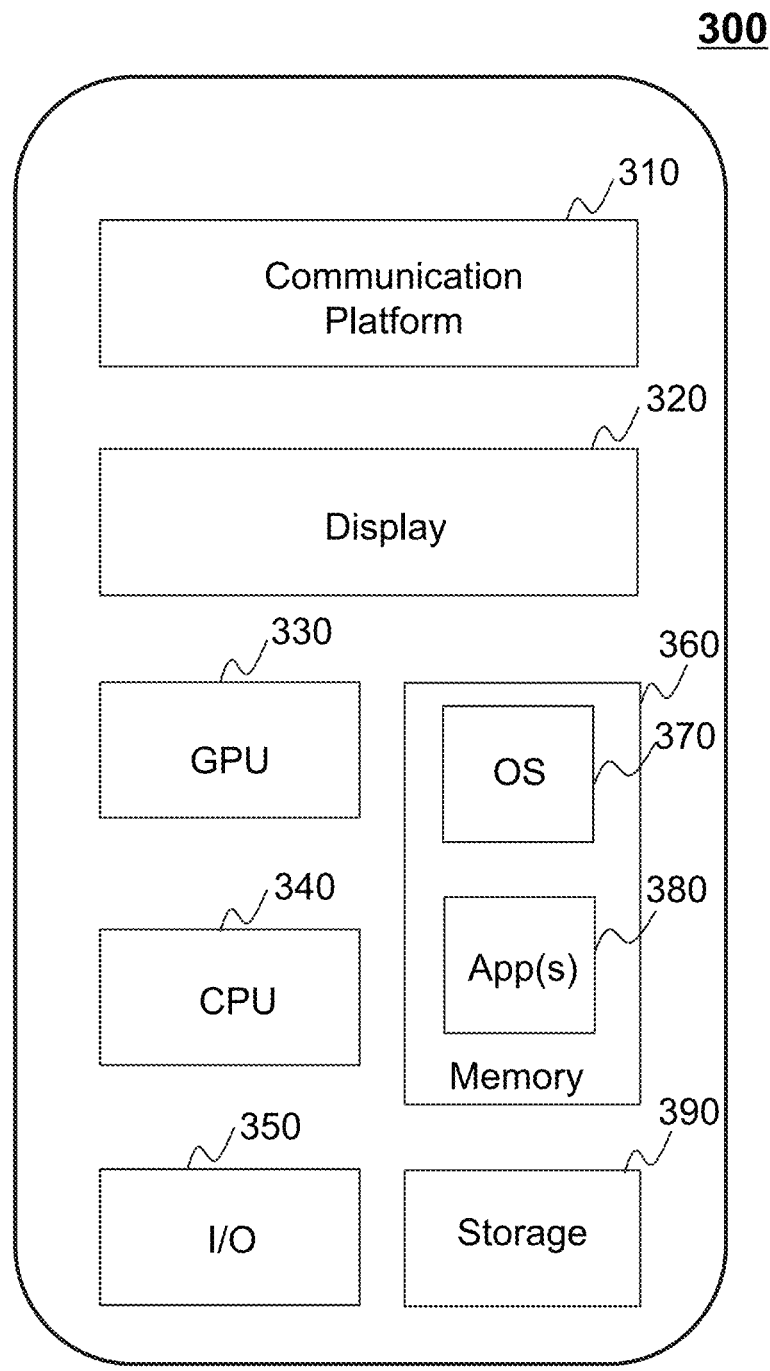
FIG. 3 is a schematic diagram illustrating an exemplary terminal device according to some embodiments of the present disclosure.

FIG. 3 is a schematic diagram illustrating an exemplary terminal device according to some embodiments of the present disclosure. In some embodiments, the user terminal 140 may be implemented on the terminal device 300 shown in FIG. 3. The terminal device 300 may be a mobile device, such as a mobile phone of a passenger or a driver, a built-in device on a vehicle driven by the driver. As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™' Windows Phone™, etc.) and one or more Apps (applications) 380 may be loaded into the memory 360 from the storage 390 in order to be executed by the CPU 340. User interactions may be achieved via the I/O 350 and provided to the server 110 and/or other components of the system 100 via the network 120. The terminal device 300 may transmit/receive data related to the image to be processed via the communication platform 310. For example, the terminal device 300 may receive the position and the lane line category of one or more determined lane lines from the server 110 via the communication platform 310.

Figure 4:
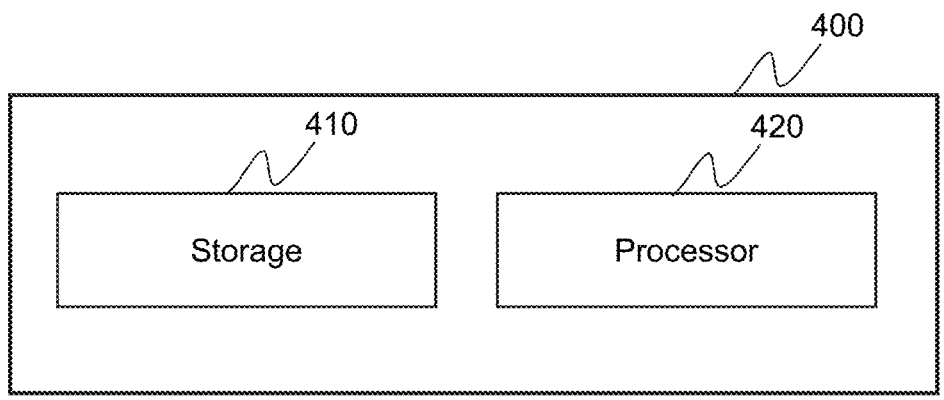
FIG. 4 is a block diagram illustrating an exemplary detection device according to some embodiments of the present disclosure.

FIG. 4 is a block diagram illustrating an exemplary detection device according to some embodiments of the present disclosure. As shown in FIG. 4, the lane line detection device 600 may include a processor 420 and a storage 410. One or more computer programs may be stored in the storage 410, and the processor 420 may be used to execute the one or more computer programs to implement a lane line detection method.

In some embodiments, the lane line detection method may include obtaining an image and determining a semantic category for each of a plurality of pixels in the image. The lane line detection method may further include determining one or more pixel sets based on the plurality of pixels according to a predetermined rule. Each of the one or more pixel sets may include one or more pixels of a same semantic category. The lane line detection method may further include performing a fitting operation to obtain one or more fitting lines corresponding to one or more lane lines.

In some embodiments, the fitting operation may be an iterative fitting operation on each of the one or more pixels in the pixel set. In each iteration, it may be determined whether there are one or more erroneous pixels that satisfy a predetermined condition in a pixel set. In response to a determination that there are one or more erroneous pixels that satisfy the predetermined condition, the one or more erroneous pixels may be removed from the pixel set.

In some embodiments, a binarization operation may be performed to obtain binary information of each of the plurality of pixels. A lane line category of a lane line may be determined at least based on the binary information of the one or more pixels in a pixel set.

In some embodiments, the trained semantic segmentation network may include one or more convolutional layers and one or more deconvolutional layers. The one or more convolutional layers may be configured for a depth-wise separable convolution. For example, the trained semantic segmentation network may be constructed based on a Mobilenet and a fully convolutional network (FCN). More details regarding the lane line detection method may be found elsewhere in the present disclosure, for example, in FIGS. 7, 11-13, and 15-17.

In some embodiments, the one or more computer programs can be stored in a computer storage medium. According to another aspect of the present disclosure, a computer storage medium is provided.

Figure 5:
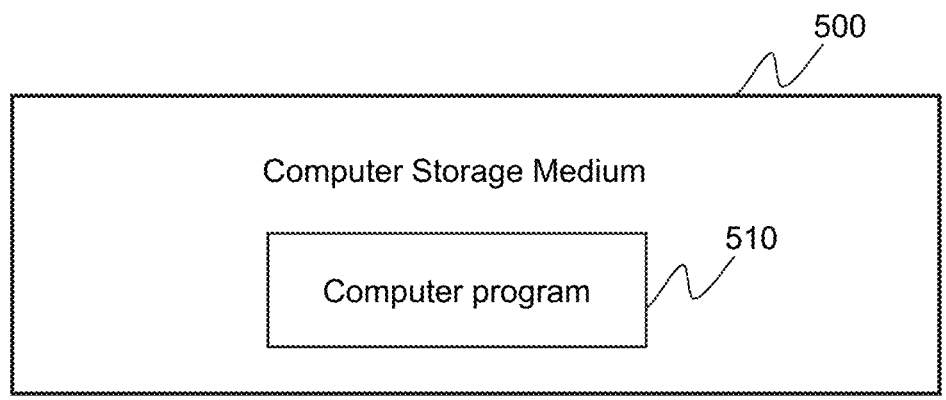
FIG. 5 is a block diagram illustrating an exemplary computer storage medium according to some embodiments of the present disclosure.

FIG. 5 is a block diagram illustrating an exemplary computer storage medium according to some embodiments of the present disclosure. As shown in FIG. 5, one or more computer programs may be stored in the computer storage medium 500. When the one or more computer programs 510 are executed by the processor, the lane line detection method may be implemented.

The computer storage medium 500 may include a Universal Serial Bus (USB) flash disk, a mobile hard disk, a Read-Only Memory (ROM), a Random Access Memory (RAM), a magnetic disk, or an optical disk, or it can be a server (e.g., the server 110 in FIG. 1) that stores the one or more computer programs 510. The server may send the one or more stored computer programs to other devices, or the server may execute the one or more stored computer programs. In some embodiments, the computer storage medium 700 may be a combination of physical entities, such as a plurality of servers, a server, with a storage, or a storage with a mobile hard disk.

Figure 6:
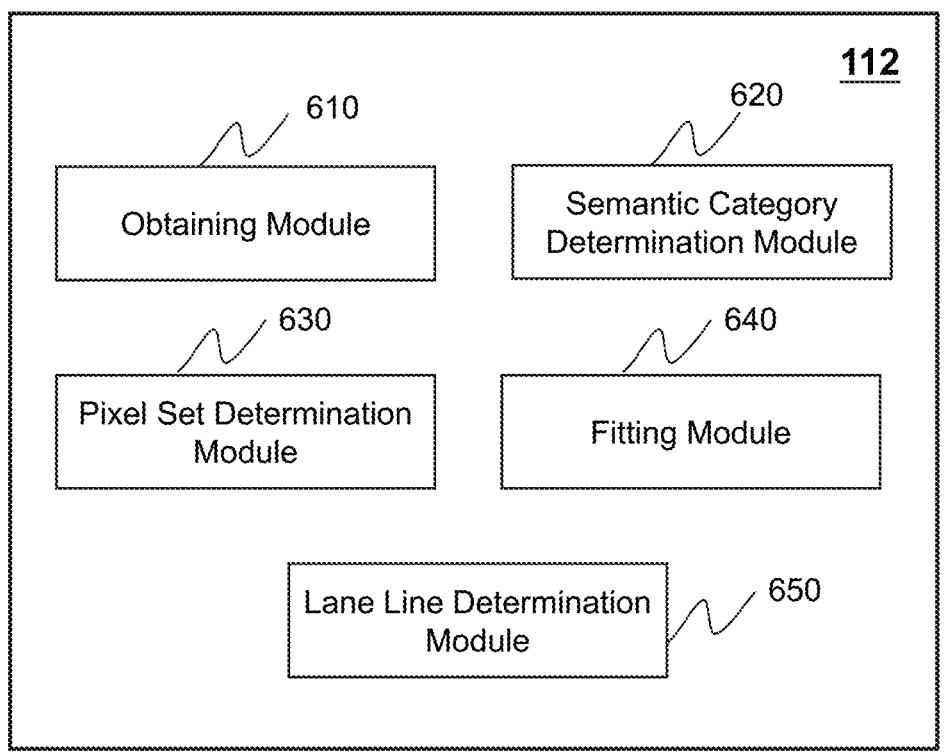
FIG. 6 is a block diagram illustrating an exemplary processing device according to some embodiments of the present disclosure.

FIG. 6 is a block diagram illustrating an exemplary processing engine according to some embodiments of the present disclosure. In some embodiments, the processing engine 112 may be implemented on the server 110. The processing engine 112 may communicate with a storage medium (e.g., the storage device 120 of the system 100, and/or the storage 390 of the terminal device 300), and may execute instructions stored in the storage medium. In some embodiments, the processing engine 112 may include an obtaining module 610, a semantic category determination module 620, a pixel set determination module 630, a fitting module 640, and a lane line determination module 650.

The obtaining module 610 may obtain data from one or more components of the system 100. In some embodiments, the obtaining module 610 may obtain an image. In some embodiments, the image may be associated with a scene on the road, and the image may also be referred to as a "road image". The obtaining module 610 may obtain the image from an acquisition device (e.g., the acquisition device 130 in FIG. 1). For instance, the acquisition device may be a camera installed near the road or on a moving car. For example, the camera may be a surveillance camera attached to or as part of a street lamp or a road sign. The camera may acquire the information on the road (e.g., information associated with a scene on the road) at predetermined time intervals (e.g., 0.2 second, 0.5 second, 1 second, or the like).

The semantic category determination module 620 may determine a semantic category for each of a plurality of pixels in the road image. The semantic category determination module 620 may determine, for each of a plurality of pixels in the image. a semantic category using a trained semantic segmentation network. In some embodiments, the semantic category determination module 620 may determine the semantic category of each pixel of a region of interest (ROI) in the image. The ROI may include the road and objects on the road (e.g., vehicles, lane lines). In some embodiments, the semantic category determination module 620 may input the image into the trained semantic segmentation network. A semantic image may be outputted by the trained semantic segmentation network, and thus the semantic category of each pixel can be obtained. In some embodiments, the trained semantic segmentation network may identify whether a pixel corresponds to a lane line or a background. In some embodiments, the semantic category determination module 620 may further perform a binarization operation to obtain binary information of one or more pixels and determine a lane line category of a lane line corresponding to the pixel (e.g., whether the pixel corresponds to a dashed line or a solid line). In some embodiments, the semantic segmentation network may determine the lane line category of the lane line corresponding to the pixel. In some embodiments, the lane line in the image may be presented in red or green, the other portions may be rendered in black as the background. For example, the solid line may be displayed in red and the dashed line may be displayed in green. That is, the pixel value may be processed (e.g., by assigning different pixel values to pixels of different semantic categories), and the semantic category may be represented by the pixel value.

In some embodiments, the semantic segmentation network in the present disclosure may use a depth-wise separable convolution structure to extract one or more features of the images to obtain one or more feature convolutional layers (also referred to as "convolutional layers") that include the one or more features of the image. The one or more feature convolutional layers are then processed using a full convolution network (FCN) to obtain the semantic category for each pixel in the image.

The pixel set determination module 630 may determine one or more pixel sets based on the plurality of pixels in the road image. The pixel set determination module 630 may determine one or more pixel sets based on the plurality of pixels according to a predetermined rule. Each of the one or more pixel sets may include one or more pixels of a same semantic category. After obtaining the semantic category of each of the plurality of pixels in the image, the detection device may select one or more pixels of the same semantic category and filter the one or more pixels according to a predetermined rule, and the pixels may be combined into a pixel set. Each of the obtained pixel sets may correspond to a lane line. The predetermined rule is set so that the pixels that are relatively close can be combined in a pixel set. For example, the predetermined rule may include that an absolute value of a difference between coordinates of a pixel and a first pixel is less than or equal to a preset difference value. The coordinates may be an abscissa value and/or an ordinate value. Similarly, in other embodiments, the predetermined rule may also include other rules, and different rules may be set according to the requirements of the designer, and details are not described herein.

The fitting module 640 may perform a fitting operation to obtain one or more fitting lines corresponding to the one or more pixel sets. In some embodiments, the fitting module 640 may perform a fitting operation on each pixel set to obtain a fitting line as a lane line, and the fitting line may be a straight fitting line or a fitting curve. Generally, each pixel set may correspond to a lane line, and a fitting operation may be performed on each pixel set so that the corresponding lane line is determined. In some embodiments, the fitting operation may be an iterative fitting operation. The fitting module 640 may determine whether there are one or more erroneous pixels in each of the one or more pixel sets. In response to a determination that there are one or more erroneous pixels in a pixel set, the detection device may remove the one or more erroneous pixels from the pixel set. For example, the fitting module 640 may determine, for each of one or more pixels in the pixel set, a first difference between a fitted coordinate and an actual coordinate associated with the pixel. The actual coordinates of the pixels in the pixel set may be obtained, and a fitted coordinate of each pixel may be determined according to the estimated line equation. The first difference between the fitted coordinate (e.g., a fitted y-axis coordinate) and the actual coordinate (e.g., an actual y-axis coordinate) associated with the pixel may be determined and compared with the first threshold.

If the first difference is less than or equal to the first threshold, it means that the pixel is not far from the fitting line. The pixel may be considered as a normal pixel in a lane line, and no further processing may be needed for the pixel. If the first difference is greater than the first threshold, it means that the pixel is located relatively far from the fitting line. The pixel may be determined as an interfering pixel (i.e., an erroneous pixel). The fitting module 640 may remove one or more erroneous pixels of which the first difference is greater than a first threshold to update the pixel set. The fitting module 640 may re-perform the linear fitting operation on the updated pixel set. if for each of the one or more fitting parameters, a second difference between the fitting parameters estimated in two consecutive iterations is less than or equal to a second threshold, the fitting module 640 may stop updating the pixel set. The second difference may relate to a termination criterion for the iterative fitting operation. When the termination criterion is satisfied, the fitting module 640 may stop the iterations. For instance, the termination criterion may include that the second difference is less than or equal to the second threshold. In some embodiments, the second difference may be a difference value between the fitting parameters estimated in two consecutive iterations. In some embodiments, the second difference may be a rate of change between the fitting parameters estimated in two consecutive iterations.

The lane line determination module 650 may determine a position and a lane line category of the lane line. In some embodiments, the lane line determination module 650 may determine a position of one or more lane lines based on the fitting line. In some embodiments, the lane line determination module 650 may determine a lane line category of the lane line, for example, based on the semantic category of the pixel set corresponding to the lane line and/or binary information of the lane line. the trained semantic segmentation network may identify whether a pixel corresponds to a lane line or the background (i.e., the portion of the image that does not include any lane lines) without identifying the lane line category corresponding to the lane line. In some embodiments, the trained segmentation network may identify whether a pixel corresponds to a lane line or the background and a reference lane line category corresponding to the lane line. If the fitting parameters of a pixel set are not similar to any fitting parameters (i.e., a difference between two fitting parameters are less than a third threshold) of other pixel sets, the reference lane line category may be determined as the lane line category of a lane line corresponding to the pixel set. If at least two pixel sets of the same semantic category have similar fitting parameters, the lane line determination module 650 may combine the at least two pixel sets. The lane line determination module 650 may determine the lane line category associated with the combined pixel set based at least on the binary information of each of the one or more pixels in the combined pixel set.

In some embodiments, the lane line determination module 650 may perform a binarization operation to obtain binary information of each of the plurality of pixels. In some embodiments, the lane line determination module 650 may perform an edge extraction operation on the plurality of pixels in the image to obtain edge information associated with each of the plurality of pixels. The edge information associated with a pixel may indicate whether the pixel corresponds to a portion of an edge in the image. For instance, the lane line determination module 650 may use a Sobel operator to perform the edge extraction operation. The lane line determination module 650 may further determine, based on the edge information, the binary information of each of the plurality of pixels. The binary information may include the pixel value of a pixel after the binarization operation. For instance, if the pixel corresponds to a portion of an edge in the image, the pixel value of the pixel may be determined as 255, and if the pixel does not correspond to a portion of an edge, the pixel value of the pixel may be determined as 0. The lane line determination module 650 may determine, for each of the plurality of pixels, a searching range based on a fitted coordinate of the pixel. The lane line determination module 650 may traverse, for each of the one or more pixel sets, the one or more pixels in the pixel set and record a reference number count of reference pixels. If the reference number count is greater than a count threshold, the lane line determination module 650 may determine that the semantic category of the combined pixel set is the dashed line. If the reference number count is less than or equal to a count threshold, the lane line determination module 650 may determine that the semantic category of the combined pixel set is the solid line.

The modules in FIG. 6 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. In some embodiments, two or more of the modules may be combined into a single module, and any one of the modules may be divided into two or more units.

Figure 7:
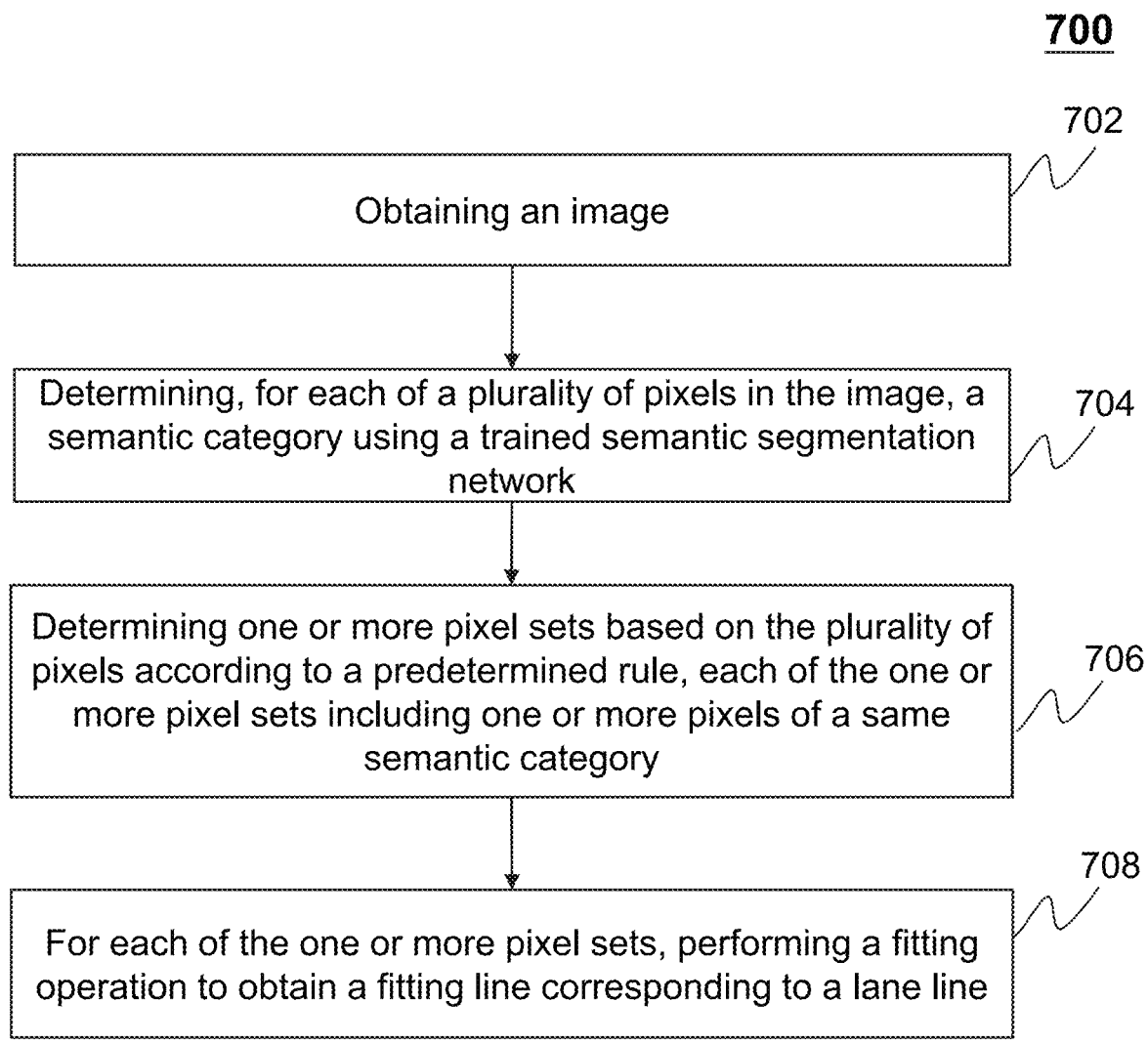
FIG. 7 is a flowchart illustrating an exemplary process for lane detection according to some embodiments of the present disclosure.

FIG. 7 is a flowchart illustrating an exemplary process for lane detection according to some embodiments of the present disclosure. In some embodiments, the process 700 may be executed by the system 100. For example, the process 700 may be implemented as a set of instructions (e.g., an application) stored in the storage (e.g., ROM 230 or RAM 240 of the computing device 200). The detection device 400, the processing engine 112 and/or modules in FIG. 4 may execute the set of instructions, and when executing the instructions, these devices and/or modules may be configured to perform the process 700. The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 702, the processing engine 112 (e.g., the obtaining module 610) may obtain an image. In some embodiments, the image may be associated with a scene on the road, and the image may also be referred to as a "road image". One or more road marks may be identified from the road image according to operations 704-708. The one or more road marks may have different patterns or shapes. For instance, the one or more road marks may include a lane line, a speed limit tag painted on the road, a pedestrian crossing, a lane direction mark that indicates a direction toward which vehicles on this lane can move or the like, or any combination thereof. For illustration purposes, the following description mainly relates to the detection of lane lines. But it should be understood that the mechanism disclosed herein may be applied to various road marks.

In some embodiments, a detection device (e.g., the detection device 400) may obtain the image. The detection device may be communicatively connected to an acquisition device (e.g., the acquisition device 130 in FIG. 1). For instance, the acquisition device may be a camera installed near the road or on a moving car. For example, the camera may be a surveillance camera attached to or as part of a street lamp or a road sign. The camera may acquire the information on the road (e.g., information associated with a scene on the road) at predetermined time intervals (e.g., 0.2 second, 0.5 second, 1 second, or the like). The camera may use the acquired information as the image or synthesize the acquired information into the image, and then send the image to the detection device.

In some embodiments, the detection device may be connected to an external storage device, and the external storage device may be a mobile hard disk, a floppy disk drive, a Universal Serial Bus (USB) flash disk or an optical disk drive, etc. The external storage device may store the image, and the detection device may obtain the image directly from the external storage device.

Figure 8:
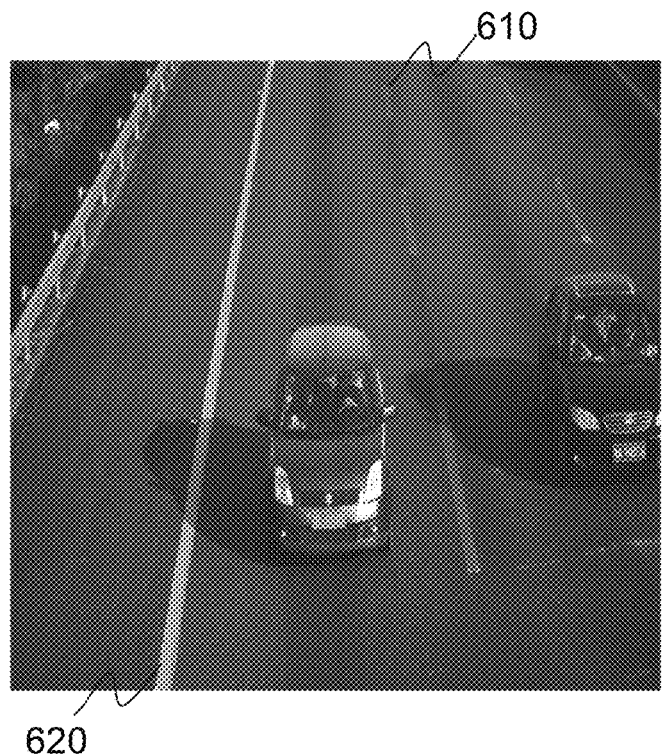
FIG. 8 is an exemplary image obtained by the image processing system according to some embodiments of the present disclosure.

FIG. 8 is an exemplary image obtained by the system 100 according to some embodiments of the present disclosure. The image may be obtained by a surveillance camera mounted, for example, on a road lamp or a street sign. As shown in FIG. 8, the image presents two cars running on different lanes on a road. The image includes two solid lane lines 620 and two dash lane lines 610. Theses lane lines may be identified according to the process 700.

In 704, the processing engine 112 (e.g., the semantic category determination module 620) may determine, for each of a plurality of pixels in the image. a semantic category using a trained semantic segmentation network. In some embodiments, the processing engine 112 may determine the semantic category of each pixel of the image. In some embodiments, the processing engine 112 may determine the semantic category of each pixel of a region of interest (ROI) in the image. The ROI may include the road and objects on the road (e.g., vehicles, lane lines).

In some embodiments, the processing engine 112 may input the image into the trained semantic segmentation network. A semantic image may be outputted by the trained semantic segmentation network, and thus the semantic category of each pixel can be obtained. In some embodiments, the trained semantic segmentation network may identify whether a pixel corresponds to a lane line or a background. In some embodiments, the processing engine 112 may further perform a binarization operation to obtain binary information of one or more pixels and determine a lane line category of a lane line corresponding to the pixel (e.g., whether the pixel corresponds to a dashed line or a solid line). In some embodiments, the trained semantic segmentation network may determine the lane line category of the lane line corresponding to the pixel. In some embodiments, the lane line in the image may be presented in red or green, the other portions may be rendered in black as the background. For example, the solid line may be displayed in red and the dashed line may be displayed in green. That is, the pixel value may be designated (e.g., by assigning different pixel values to pixels of different semantic categories), and the semantic category may be represented by the pixel value.

Figure 9:
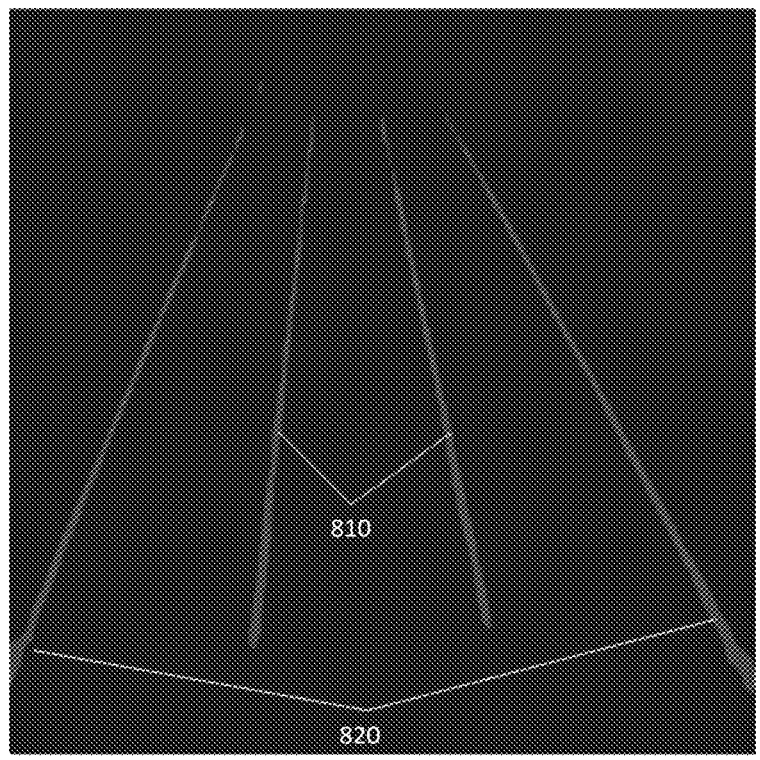
FIG. 9 is an exemplary semantic image according to some embodiments of the present disclosure.

FIG. 9 is an exemplary semantic image according to some embodiments of the present disclosure. In some embodiments, the two lines 810 may be displayed in green in the semantic image, indicating that the semantic category of each pixel on the two lines 810 is a dashed lane line. In some embodiments, the two lines 820 may be displayed in red in the semantic image, indicating that the semantic category of each pixel on the two lines 820 is a solid lane line.

In some embodiments, the trained semantic segmentation network may include a convolutional neural network (CNN), a fully convolutional network (FCN), SegNet, U-Net, or the like, or any combination thereof. In some embodiments, the trained semantic segmentation network in the present disclosure may use a depth-wise separable convolution structure to extract one or more features of the images to obtain one or more feature convolutional layers (also referred to as "convolutional layers") that include the one or more features of the image. The one or more feature convolutional layers are then processed using the FCN to obtain the semantic category for each pixel in the image. In some embodiments, the depth-wise separable convolution structure may include at least a part of the Mobilenet, the Xception, and/or other convolution structures. For example, the semantic segmentation network may be constructed based on the Mobilenet and the FCN. More details regarding the structure of the semantic segmentation network may be found elsewhere in the present disclosure, for example, in FIG. 10 and the description thereof.

In some embodiments, before operation 702, the method for lane detection may further include: obtaining an image size corresponding to the trained semantic segmentation network, and preprocess the image so that the input size of the image is consistent with the image size used for training the semantic segmentation network.

In some embodiments, the processing engine 112 may obtain the trained semantic segmentation network from the storage device 120. In some embodiments, a semantic segmentation network may be trained using a plurality of training samples. For example, each of the plurality of training samples may include a sample image and one or more labels corresponding to one or more pixels in the sample image. A label may indicate a semantic category of the pixel that is examined by a user. In some embodiments, the label may indicate whether the pixel corresponds to the background or a lane line. In some embodiments, the label may indicate that the pixel corresponds to the background, a dashed lane line, a solid lane line, or other types of lane lines.

In 706, the processing engine 112 (e.g., the pixel set determination module 630) may determine one or more pixel sets based on the plurality of pixels according to a predetermined rule. Each of the one or more pixel sets may include one or more pixels of a same semantic category.

After obtaining the semantic category of each of the plurality of pixels in the image, the detection device may select one or more pixels of the same semantic category and filter the one or more pixels according to a predetermined rule, and the pixels may be combined into a pixel set. Each of the obtained pixel sets may correspond to a lane line. The predetermined rule is set so that the pixels that are relatively close can be combined in a pixel set.

For example, the predetermined rule may include that an absolute value of a difference between coordinates of a pixel and a first pixel is less than or equal to a preset difference value. The coordinates may be an abscissa value and/or an ordinate value. Similarly, in other embodiments, the predetermined rule may also include other rules, and different rules may be set according to the requirements of the designer, and details are not described herein.

In some embodiments, according to operation 706, the detection device may obtain one or more pixel sets corresponding to a semantic category. For instance, the detection device may determine one or more pixel sets corresponding to one or more lane lines, respectively. As another example, the detection device may determine one or more pixel sets corresponding to one or more dashed lane lines and/or one or more solid lane lines, respectively.

In 708, the processing engine 112 (e.g., the fitting module 640) may perform, for each of the one or more pixel sets, a fitting operation to obtain a fitting line corresponding to a lane line.

In some embodiments, the detection device may perform a fitting operation on each pixel set to obtain a fitting line as a lane line, and the fitting line may be a fitting straight line, a fitting curve, or the like. Generally, each pixel set may correspond to a lane line, and a fitting operation may be performed on each pixel set so that the corresponding lane line is obtained, that is, the detection of the lane line is implemented. In some embodiments, the fitting operation may be an iterative fitting operation. The detection device (e.g., the processing engine 112) may determine whether there are one or more erroneous pixels in each of the one or more pixel sets. In response to a determination that there are one or more erroneous pixels in a pixel set, the detection device may remove the one or more erroneous pixels from the pixel set.

In some embodiments, the detection device may process the image using a pre-trained (i.e., trained in advance before usage) semantic segmentation network, thereby acquiring the semantic category of each pixel in the image and determining the pixel set representing the lane line according to the semantic category. The detection device may further perform a fitting operation on the pixel set, thereby implementing the detection of lane lines. Specifically, in the semantic segmentation network, the depth-wise separable convolution structure may be used to extract the image features, obtain the feature convolution layer of the image, and then use the full convolution network to process the feature convolution layer to obtain the semantic category of each pixel in the image. Through the Mobilenet-FCN, the number of parameters in the image feature extraction can be reduced, thereby reducing the amount of calculation, and by concatenating the fully connected layer of the Mobilenet into the deconvolution process, the image information can be restored to achieve the purpose of pixel classification (i.e., determining the semantic category of the pixel), thereby improving the accuracy of the pixel classification. After the pixels are classified, the pixels having the same semantic category and satisfying the predetermined rule may be added in a pixel set to obtain one or more pixel sets. A fitting operation may be performed for each pixel set to obtain a fitting line as a lane line.

In some embodiments, the processing engine 112 (e.g., the lane line determination module 650) may determine a position of one or more lane lines based on the fitting line. In some embodiments, the processing engine 112 may determine a lane line category of the lane line, for example, based on the semantic category of the pixel set corresponding to the lane line and/or binary information of the lane line. Such information related to one or more lane lines may be used in a self-driving technique, traffic violation monitoring, and/or other fields. For instance, in the self-driving technique, a vehicle may follow the lane line while moving. As another example, for traffic violation monitoring, if a vehicle is found to have changed lanes in an area where lane changing is prohibited, it may be determined that the vehicle has violated a traffic rule.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 10:
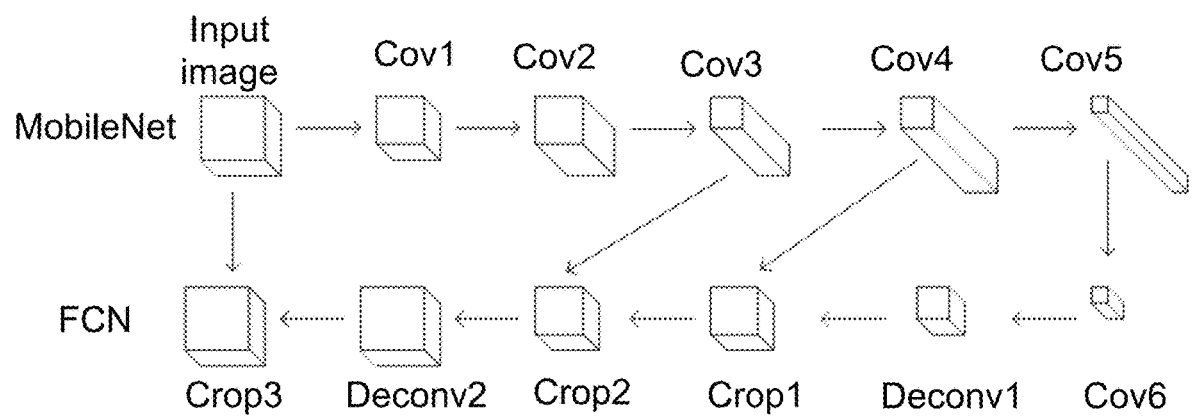
FIG. 10 is a schematic diagram illustrating an exemplary semantic segmentation network according to some embodiments of the present disclosure.

FIG. 10 is a schematic diagram illustrating an exemplary semantic segmentation network according to some embodiments of the present disclosure. Merely by way of example, the semantic segmentation network is constructed based on the Mobilenet and the FCN. A part of the semantic segmentation network corresponding to the Mobilenet may be used to extract image features of the image (i.e., the image inputted to the semantic segmentation network). Compared with traditional 3D convolution, the Mobilenet uses depthwise (depth-wise separable convolution structure) convolution to process the image. The depth-wise separable convolution structure can effectively reduce the redundant expression of the convolution. The parameters extracted by the Mobilenet are reduced to $\frac{1}{10}$ as compared with the traditional 3D convolution, and the accuracy is maintained. Since the number count of parameters has dropped significantly, the Mobilenet may be embedded in various platforms (e.g., a mobile device such as a smartphone, an on-board device of a vehicle).

Specifically, the image is input to the part corresponding to the Mobilenet, and a plurality of feature convolutional layers may be obtained after N*N convolution. After applying the convolutional layers, the Mobilenet uses several fully connected layers to connect with the convolutional layers, and information of the feature convolutional layer is mapped into a feature vector of a fixed length.

The FCN restores the size of the feature vector of the Mobilenet to the original image size by deconvolution and classifies each pixel. If the deconvolution is performed on the last fully connected layer of the Mobilenet, it may cause the image to lose much semantic information, while a few layers before the last convolutional layer of the Mobilenet retain much information such as image edges, colors, contours, or other information, or a combination thereof. Therefore, the semantic segmentation network connects a few layers before the last convolutional layer of the Mobilenet to the deconvolutional layers of the full convolution network, thereby restoring more image information and obtaining the semantic category of each pixel in the image. For instance, one or more convolutional layers and one or more deconvolutional layers may be connected via skip connections. That is, each of the one or more convolutional layers may be connected with a deconvolutional layer that is arranged after a few layers after the convolutional layer. For instance, as shown in FIG. 10, the Conv3 layer (a convolutional layer) may be connected with the Crop 2 layer that is configured to change a size of the feature vector obtained by Conv3 layer. The Crop2 layer may be connected to a Deconv2 layer (a deconvolutional layer). The Deconv2 layer may perform a deconvolution operation on the feature vector. Thus more information of the input image may be retained. The semantic segmentation network may output a semantic image of the same size as the input image. The semantic category of each of a plurality of pixels of the semantic image may be determined.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. For example, the number count of convolutional layers, crop layers and/or convolutional layers may be different from what is shown in FIG. 10.

Figure 11:
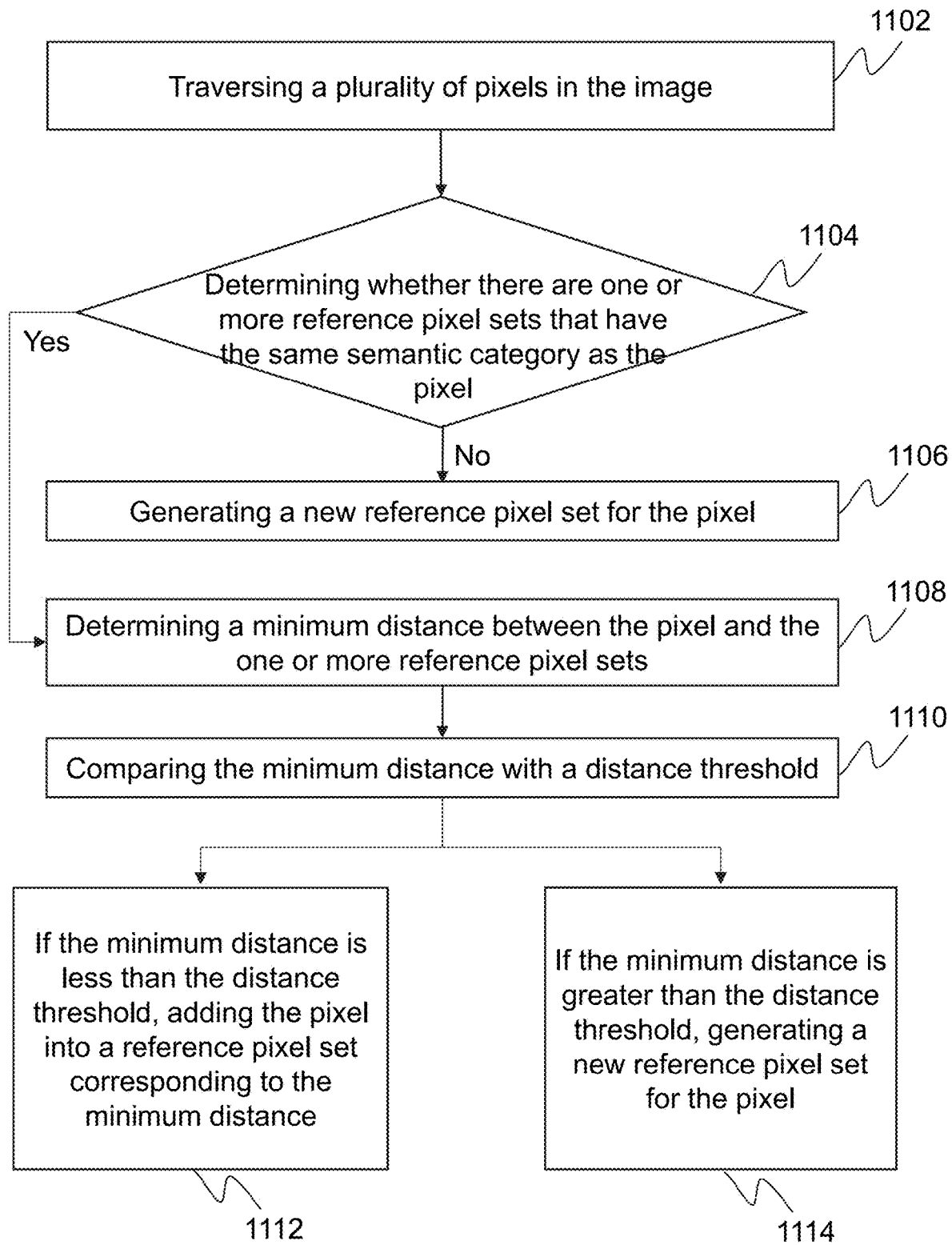
FIG. 11 is a flowchart illustrating an exemplary process for determining one or more pixel sets according to some embodiments of the present disclosure.

FIG. 11 is a flowchart illustrating an exemplary process for determining one or more pixel sets according to some embodiments of the present disclosure. In some embodiments, the process 1100 may be executed by the system 100. For example, the process 1100 may be implemented as a set of instructions (e.g., an application) stored in the storage (e.g., ROM 230 or RAM 240 of the computing device 200). The detection device 400, the processing engine 112 and/or modules in FIG. 4 may execute the set of instructions, and when executing the instructions, these devices and/or modules may be configured to perform the process 1100. The operations of the illustrated process 1100 presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting.

In 1102, the processing engine 112 (e.g., the pixel set determination module 630) may traverse a plurality of pixels in the image.

In some embodiments, a rectangular coordinate system may be determined based on the semantic image or the road image. Since the semantic image and the road image are of the same image size, the semantic image and the road image may utilize the same rectangular coordinate system. For instance, the coordinates of the pixel in the lower left corner of the road image may be designated as the origin; a lateral direction of the road image may be designated as the Y axis, and a longitudinal direction of the road image may be designated as the X axis. The plurality of pixels in the road mage may be traversed according to a predetermined direction, for example, from left to right and/or from top to bottom, to determine the semantic category of each of the plurality of pixels. In some embodiments, the plurality of pixels in the semantic image may be traversed, from left to right and from top to bottom, to detect the pixel value of the pixel. The traversal may be performed sequentially, and the pixel set may be successfully generated based on the plurality of pixels.

In 1104, the processing engine 112 (e.g., the pixel set determination module 630) may determine whether there are one or more reference pixel sets that have the same semantic category as the pixel.

As used herein, the term "reference pixel set" refers to a pixel set generated based on the semantic image during the determination of the one or more pixel sets corresponding to one or more lane lines. One or more pixels may be added into a reference pixel set. After the process 1100 is completed, one or more reference pixel sets may be designated as the one or more pixel sets corresponding to one or more lane lines. In some embodiments, for a current pixel traversed sequentially, the semantic category of the current pixel may be obtained, and the processing engine 112 may determine whether there are one or more reference pixel sets that have the same semantic category as the current pixel. If there are no reference pixels that have the same semantic category as the current pixel, the processing engine 112 may proceed to step operation 1106; if there are one or more reference pixels that have the same semantic category as the current pixel, the processing engine 112 may proceed to operation 1108.

In 1106, the processing engine 112 (e.g., the pixel set determination module 630) may generate a new reference pixel set for the pixel.

For example, when it is detected that the pixel value of the current pixel is red (255, 0, 0), and that there are no reference pixel sets that have the same semantic category as the current pixel, the processing engine 112 may generate a new reference pixel set. The current pixel may be added in the new reference pixel set as the first pixel.

In other words, when the processing engine 112 traverses the plurality of pixels in the semantic image, a pixel that is green (0, 255, 0) or red (255, 0, 0) may be firstly detected. A container 1 (i.e., a reference pixel set) may be generated, and the number count of lane lines is increased from 0 to 1. The coordinate values of the pixel and the corresponding semantic category may be saved in the container 1. The container 1 can be represented by a pixel set or in other forms, and details are not described herein.

For example, when a pixel whose Red-Green-Blue (RGB) value is green (0, 255, 0) is detected for the first time, a green container 1 may be created, and the coordinate values of the pixel and the corresponding semantic category (dashed line) may be saved in the green container 1.

In 1108, the processing engine 112 (e.g., the pixel set determination module 630) may determine a minimum distance from one or more distances between the pixel and the one or more reference pixel sets.

In some embodiments, the processing engine 112 may determine a distance between the pixel and each of the one or more reference pixel sets that have the same semantic category as the current pixel. For example, the processing engine 12 may determine a distance between the pixel that is currently traversed and a pixel that is recently added into the reference pixel sets. The processing engine 112 may further determine a minimum distance from one or more distances between the pixel and the one or more reference pixel sets.

In some embodiments, the plurality of pixels in the image (i.e., the road image or the semantic image) may be traversed in a certain order, for example, from left to right and from top to bottom. One or more pixels may be added to a reference pixel set sequentially, and therefore, the distance between the current pixel and the reference pixel set may be the distance between the current pixel and the pixel stored in the pixel set, that is, the distance between the current pixel and the uppermost pixel in the container (i.e., a pixel that is most recently added into the reference pixel set). In some embodiments, the same principles may be employed if the semantic images are traversed in a different manner.

In 1110, the processing engine 112 (e.g., the pixel set determination module 630) may compare the minimum distance with a distance threshold. The distance threshold may be a default value of the system 100 or may be determined by a user. For instance, the distance threshold may be 10, 20, 30, etc.

In 1112, if the minimum distance is less than the distance threshold, the processing engine 112 (e.g., the pixel set determination module 630) may add the pixel into a reference pixel set corresponding to the minimum distance.

If the minimum distance is less than the preset distance threshold, it indicates that the current pixel is mostly close to the recent pixel in the reference pixel set and that the current pixel may be considered as the pixel of the same lane line. Thus, the current pixel may be added to the reference pixel set.

For example, when a pixel whose pixel value is green (0, 255, 0) is detected again, if the minimum distance between the pixel and the recent pixel in the green container 1 is less than the distance threshold, the pixel may be added into the green container 1.

In 1114, if the minimum distance is greater than the distance threshold, the processing engine 112 (e.g., the pixel set determination module 630) may generate a new reference pixel set for the pixel.

If the minimum distance is greater than or equal to the distance threshold, it indicates that the current pixel is relatively far from the one or more reference pixel sets, and that the current pixel may correspond to another lane line that is different from the one or more lane lines corresponding to the one or more reference pixel sets. Therefore, instead of adding the current pixel to the one or more existing reference pixel sets, a new reference pixel set may be generated based on the current pixel.

For example, when a pixel with the RGB value of green (0, 255, 0) is detected for a second time, if it is determined that the minimum distance of the pixel and a recent pixel in the green container 1 is greater than or equal to the distance threshold, a new green container 2 may be created, the number of lane lines may be increased by 1. The current pixel may be added into the green container 2.

When traversing the plurality of pixels sequentially, operations 1104-1114 may be performed for each of the plurality of pixels. After the traversing process, one or more reference pixel sets may be designated as one or more pixel sets corresponding to one or more lane lines. The number count of pixel sets may indicate the number count of lane lines in the semantic image and the road image. Further, a fitting operation may be performed on a plurality of pixel sets. The position and a lane line category of each of the one or more lane lines (a dashed line or solid line) can be obtained.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 12:
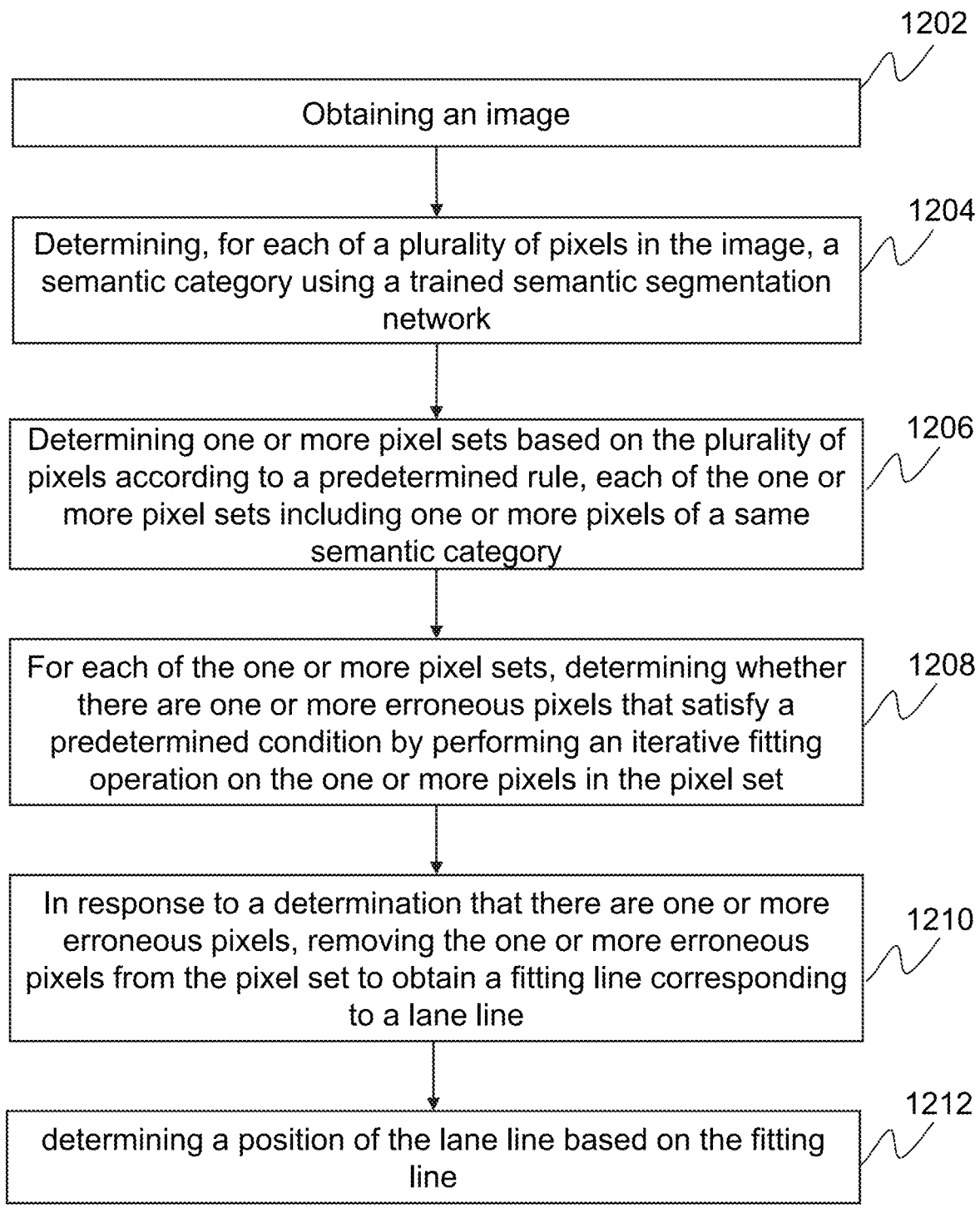
FIG. 12 is a flowchart illustrating an exemplary process for lane detection according to some embodiments of the present disclosure.

FIG. 12 is a flowchart illustrating an exemplary process for lane detection according to some embodiments of the present disclosure. In some embodiments, the process 1200 may be executed by the system 100. For example, the process 1200 may be implemented as a set of instructions (e.g., an application) stored in the storage (e.g., ROM 230 or RAM 240 of the computing device 200). The detection device 400, the processing engine 112 and/or modules in FIG. 4 may execute the set of instructions, and when executing the instructions, these devices and/or modules may be configured to perform the process 1200. The operations of the illustrated process 1200 presented below are intended to be illustrative. In some embodiments, the process 1200 may be accomplished with one or more additional operations not described, and/or without one or more of the operations discussed. Additionally, the order in which the operations of the process 1200 as illustrated in FIG. 12 and described below is not intended to be limiting.

In 1202, the processing engine 112 (e.g., the obtaining module 610) may obtain an image.

In 1204, the processing engine 112 (e.g., the semantic category determination module 620) may determine, for each of a plurality of pixels in the image, a semantic category using a trained semantic segmentation network.

In 1206, the processing engine 112 (e.g., the pixel set determination module 630) may determine one or more pixel sets based on the plurality of pixels according to a predetermined rule, each of the one or more pixel sets including one or more pixels of a same semantic category.

Operations 1202 to 1206 may be performed in a similar manner as described in operations 702 to 706.

In 1208, the processing engine 112 (e.g., the fitting module 640) may determine, for each of the one or more pixel sets, whether there are one or more erroneous pixels that satisfy a predetermined condition by performing an iterative fitting operation on the one or more pixels in the pixel set. In some embodiments, the iterative fitting operation may include a plurality of iterations. In each iteration associated with the pixel set, the processing engine 112 may perform a fitting operation on coordinates of one or more pixels in the pixel set to obtain an estimated fitting line, and determine whether there are one or more erroneous pixels that satisfy the predetermined condition.

In 1210, in response to a determination that there are one or more erroneous pixels, the processing engine 112 (e.g., the fitting module 640) may remove the one or more erroneous pixels from the pixel set to obtain a fitting line corresponding to a lane line. In some embodiments, in each iteration associated with the pixel set, the processing engine 112 may determine whether there are one or more erroneous pixels in the pixel set. In response to a determination that there are one or more erroneous pixels in the pixel set, the processing engine 112 may remove the one or more erroneous pixels in the pixel set to update the pixel set. In a next iteration, the processing engine 112 may re-perform a fitting operation on the updated pixel set and generate an estimated fitting line and determine whether there are one or more erroneous pixels in the updated pixel set. After a termination criterion for the iterative fitting operation is satisfied, the processing engine 112 may stop the iterations, and designate the updated pixel set in the final iteration as a pixel set corresponding to a lane line. More details regarding the iterative fitting operation may be found elsewhere in the present disclosure, for example, in FIG. 13 and the description thereof.

Each pixel set may include a plurality of pixels that form a lane line. In some embodiments, the semantic category of the pixel set may also indicate the lane line category of the lane line. By classifying the above pixel values, it is possible to recognize the lane line in various scenes. In some embodiments, problems such as interference lines or semantic category errors may occur due to factors such as light (e.g., strong light, weak light) and environment (e.g., when it is rainy). As compared to a traditional simple fitting operation, the iterative operation may help improve the accuracy of the lane line.

Figure 13:
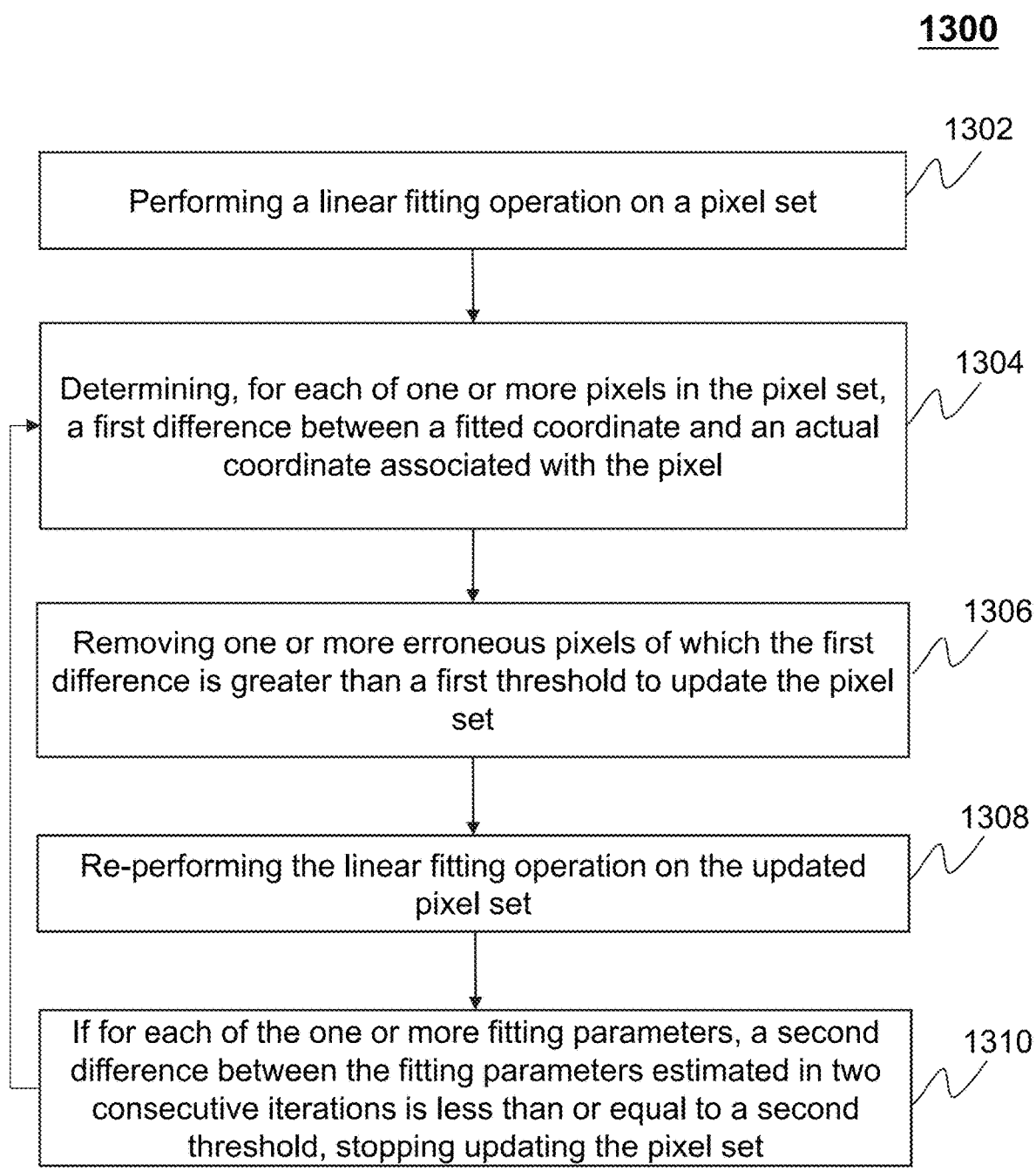
FIG. 13 is a flowchart illustrating an exemplary process for an iterative fitting operation according to some embodiments of the present disclosure.
Figure 14:
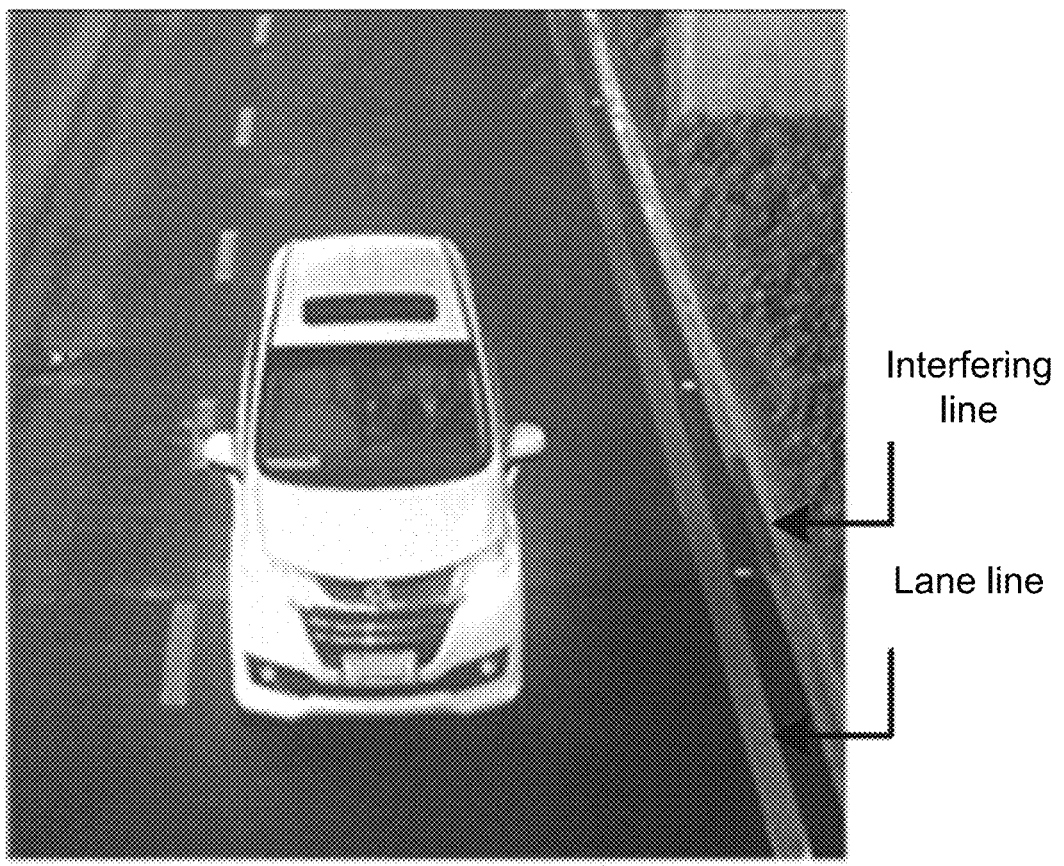
FIG. 14 is a schematic diagram illustrating an exemplary interfering line and an exemplary lane line according to some embodiments of the present disclosure.

FIG. 14 is a schematic diagram illustrating an exemplary interfering line and an exemplary lane line according to some embodiments of the present disclosure. As shown in FIG. 14, after a traditional fitting operation is performed, a portion of a side wall of the green belt is mistakenly determined as a pixel set corresponding to a lane line, which is actually an interfering line. If the processing engine 112 performs the iterative fitting operation, for example, as described in connection with FIG. 12 or FIG. 13, the pixels corresponding to the interfering line may be determined as erroneous pixels and may be removed from the pixel set. Thus, the position of the lane line may be more accurately determined.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

FIG. 13 is a flowchart illustrating an exemplary process for an iterative fitting operation according to some embodiments of the present disclosure. In some embodiments, the process 1300 may be executed by the system 100. For example, the process 1300 may be implemented as a set of instructions (e.g., an application) stored in the storage (e.g., ROM 230 or RAM 240 of the computing device 200). The detection device 400, the processing engine 112 and/or modules in FIG. 4 may execute the set of instructions, and when executing the instructions, these devices and/or modules may be configured to perform the process 1300. The operations of the illustrated process 1300 presented below are intended to be illustrative. In some embodiments, the process 1300 may be accomplished with one or more additional operations not described, and/or without one or more of the operations discussed. Additionally, the order in which the operations of the process 1300 as illustrated in FIG. 13 and described below is not intended to be limiting.

In 1302, the processing engine 112 (e.g., the fitting module 640) may perform a linear fitting operation on a pixel set.

In some embodiments, a coordinate system may be established, for example, as described in connection with operation 1102. Merely by way of example, a linear fitting operation may be performed to obtain a straight fitting line, thereby obtaining a straight line equation for a fitted lane line.

Specifically, if $(\overline{x}, \overline{y})$ is the actual coordinates of the pixel in a certain pixel set, it is assumed that the line equation obtained by the linear fitting operation on the pixel set is $y=k*x+b$. k denotes an intercept of the fitting line, while b denotes a slope of the fitting line. In some embodiments, the loss function of the fitting line based on the line equation may be presented using the following equation (1)

$$S=\Sigma_{i=1}^{n}(y_i-\overline{y}_i)^2, \tag{1}$$

where n denotes the number of pixels in the pixel set; i denotes a specific pixel in the pixel set; and $y_i$ is a fitted coordinate value determined based on the line equation and the actual coordinate $\overline{x}_i$. Since $y=k*x+b$, the loss function may also be expressed using the following equation (2)

$$S=\Sigma_{i=1}^{n}(k*x_i+b-\overline{y}_i)^2, \tag{2}$$

The partial derivatives of the loss function may be determined, respectively, using the following equation (3) and equation (4):

$$\frac{\partial S}{\partial k} = 2*\sum_{i=1}^{n}(k*x_i+b-\overline{y}_i)*x_i, \text{ and} \tag{3}$$

-continued $$\frac{\partial S}{\partial b} = 2 * \sum_{i=1}^{n} (k * x_i + b - \overline{y}_i), \qquad (4)$$

Where, assuming that $$\frac{\partial S}{\partial k} = 0, \frac{\partial S}{\partial b} = 0, A = \sum_{i=1}^{n} x_i * x_i, B = \sum_{i=1}^{n} x_i,$$
$$C = \sum_{i=1}^{n} y_i * x_i \text{ and } D = \sum_{i=1}^{n} y_i,$$

then, the fitting parameter k (i.e., the intercept of a straight line) and the fitting parameter b (i.e., the slope of the straight line) in the straight line equation may be determined according to the following equation (5):

$$k = \frac{Cn - BD}{An - BB}, \text{ and} \qquad (5)$$

$$b = \frac{AD - BC}{An - BB}. \qquad (6)$$

In each iteration of the iterative fitting operation, an estimated fitting line is obtained based on the estimated values of k and b. In the semantic image, when the semantic category of two pixels are the same, and the positions of the two pixels are relatively close, the two pixels may be considered to be added in the same reference pixel set. But in fact, if one of the pixels is an erroneous pixel, it may affect the linear fitting result of the pixel set. As a result, the least square method may cause the straight line to tilt to the left or right side, and thus the accuracy of the fitting line may be decreased. Therefore, the lane line detection method of this embodiment may include removing the interfering points according to operations 1304-1310, and iteratively updates the pixel set until the rate of change of the fitting parameter k and the fitting parameter b are less than corresponding parameter thresholds, respectively.

In 1304, the processing engine 112 (e.g., the fitting module 640) may determine, for each of one or more pixels in the pixel set, a first difference between a fitted coordinate and an actual coordinate associated with the pixel.

The actual coordinates of the pixels in the pixel set may be obtained, and a fitted coordinate of each pixel may be determined according to the estimated line equation. The first difference between the fitted coordinate (e.g., a fitted y-axis coordinate) and the actual coordinate (e.g., an actual y-axis coordinate) associated with the pixel may be determined and compared with the first threshold.

If the first difference is less than or equal to the first threshold, it means that the pixel is not far from the fitting line. The pixel may be considered as a normal pixel in a lane line, and no further processing may be needed for the pixel. If the first difference is greater than the first threshold, it means that the pixel is located relatively far from the fitting line. The pixel may be determined as an interfering pixel (i.e., an erroneous pixel) that needs to be removed in operation 1306.

In 1306, the processing engine 112 (e.g., the fitting module 640) may remove one or more erroneous pixels of which the first difference is greater than a first threshold to update the pixel set.

In 1308, the processing engine 112 (e.g., the fitting module 640) may re-perform the linear fitting operation on the updated pixel set.

In some embodiments, the linear fitting operation may be re-performed on the updated pixel set to obtain an updated fitting parameter k and updated fitting parameter b. The updated fitting parameters k and b are compared with the fitting parameters k and b before the update. The rate of change of the fitting parameter k and the rate of change of the fitting parameter b may be obtained.

In 1310, if for each of the one or more fitting parameters, a second difference between the fitting parameters estimated in two consecutive iterations is less than or equal to a second threshold, the processing engine 112 (e.g., the fitting module 640) may stop updating the pixel set. The second difference may relate to a termination criterion for the iterative fitting operation. When the termination criterion is satisfied, the processing engine 112 may stop the iterations. For instance, the termination criterion may include that the second difference is less than or equal to the second threshold. In some embodiments, the second difference may be a difference value between the fitting parameters estimated in two consecutive iterations. In some embodiments, the second difference may be a rate of change between the fitting parameters estimated in two consecutive iterations.

If the rate of change of the at least one fitting parameter is greater than or equal to the corresponding second threshold, it indicates that there are one or more erroneous pixels in the pixel set, which may affect the accuracy of the fitting line. Operations 1304-1308 may be repeated. If the rates of change of both of the fitting parameters (k and b) are less than the corresponding second thresholds, the iteration of the least squares method may be stopped.

In some embodiments, when the first difference of each of the plurality of pixels in the pixel set is less than the first threshold, and the second difference for the estimated fitting line is still greater than or equal to the second threshold, the value of the first threshold may be reduced. Then operations 1304-1308 may be repeated until the second difference is less than the second threshold. In the linear fitting process, the lane line detection method tests whether there are one or more erroneous pixels in the pixel set. If there are one or more erroneous pixels in the pixel set, the one or more erroneous pixels may be deleted or removed, thereby eliminating the influence of the one or more erroneous pixels. In this way, the accuracy of the fitting line is improved, thus improving the likelihood of correctly determining the position of the lane line.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. For example, other termination criteria may also be adopted, which are not limited by the present disclosure.

Figure 15:
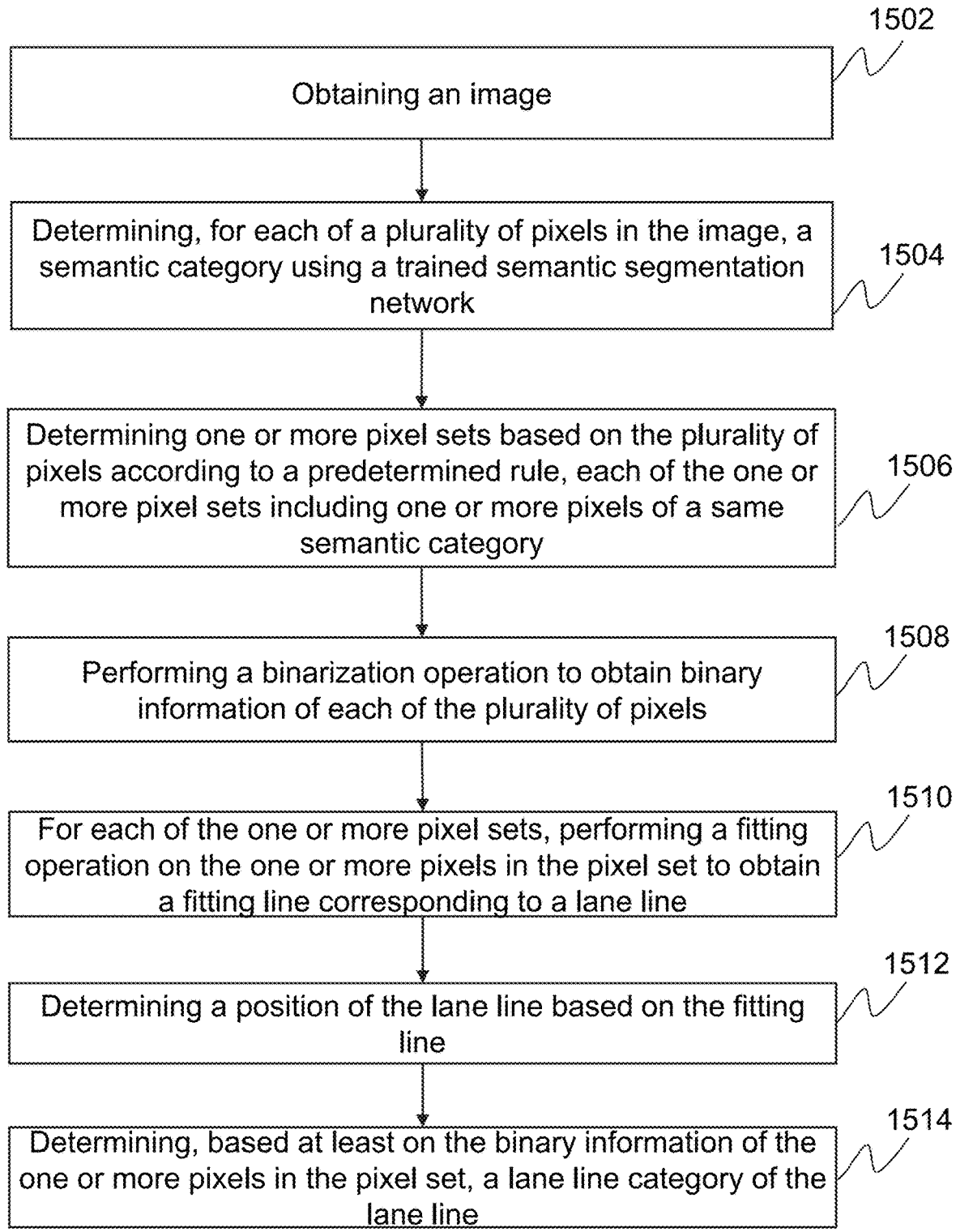
FIG. 15 is a flowchart illustrating an exemplary process for lane detection according to some embodiments of the present disclosure.

FIG. 15 is a flowchart illustrating an exemplary process for lane detection according to some embodiments of the present disclosure. In some embodiments, the process 1500 may be executed by the system 100. For example, the process 1500 may be implemented as a set of instructions (e.g., an application) stored in the storage (e.g., ROM 230 or RAM 240 of the computing device 200). The detection device 400, the processing engine 112 and/or modules in FIG. 4 may execute the set of instructions, and when executing the instructions, these devices and/or modules may be configured to perform the process 1500. The operations of the illustrated process 1500 presented below are intended to be illustrative. In some embodiments, the process 1500 may be accomplished with one or more additional operations not described, and/or without one or more of the operations discussed. Additionally, the order in which the operations of the process 1500 as illustrated in FIG. 15 and described below is not intended to be limiting.

In 1502, the processing engine 112 (e.g., the obtaining module 610) may obtain an image.

In 1504, the processing engine 112 (e.g., the semantic category determination module 620) may determine, for each of a plurality of pixels in the image, a semantic category using a trained semantic segmentation network.

In 1506, the processing engine 112 (e.g., the pixel set determination module 630) may determine one or more pixel sets based on the plurality of pixels according to a predetermined rule, each of the one or more pixel sets including one or more pixels of a same semantic category.

Operations 1502 to 1506 may be performed in a similar manner as described in operations 702 to 706.

In 1508, the processing engine 112 (e.g., the lane line determination module 650) may perform a binarization operation to obtain binary information of each of the plurality of pixels. In some embodiments, the processing engine 112 may perform an edge extraction operation on the plurality of pixels in the image to obtain edge information associated with each of the plurality of pixels. The edge information associated with a pixel may indicate whether the pixel corresponds to a portion of an edge in the image. For instance, the processing engine 112 may use an edge extraction operator to perform the edge extraction operation. Exemplary edge extraction operators may include a Sobel operator, a Prewitt operator, a Robert operator, a Laplace operator, or the like, or any combination thereof. The processing engine 112 may further determine, based on the edge information, the binary information of each of the plurality of pixels. The binary information may include the pixel value of a pixel after the binarization operation. For instance, if the pixel corresponds to a portion of an edge in the image, the pixel value of the pixel may be determined as 255, and if the pixel does not correspond to a portion of an edge, the pixel value of the pixel may be determined as 0.

In 1510, the processing engine 112 (e.g., the lane line determination module 650) may perform, for each of the one or more pixel sets, a fitting operation on the one or more pixels in the pixel set to obtain a fitting line corresponding to a lane. In some embodiments, operation 1510 may be performed in a similar manner as described in connection with operation 708.

In 1512, the processing engine 112 (e.g., the lane line determination module 650) may determine a position of the lane line based on the fitting line. For instance, a coordinate system established based on the image. The position of the lane line may be determined based on an equation corresponding to the fitting line (i.e., the line equation).

In 1514, the processing engine 112 (e.g., the lane line determination module 650) may determine, based at least on the binary information of the one or more pixels in the pixel set, a lane line category of the lane line. In some embodiments, in operation 1504, the trained semantic segmentation network may identify whether a pixel corresponds to a lane line or the background (i.e., the portion of the image that does not include any lane lines) without identifying the lane line category corresponding to the lane line. The lane line category of the lane line may be determined based at least on the binary information of each of the one or more pixels in the pixel set. In some embodiments, in operation 1504, the trained segmentation network may identify whether a pixel corresponds to a lane line or the background and a reference lane line category corresponding to the lane line. If the fitting parameters of a pixel set are not similar to any fitting parameters (i.e., a difference between two fitting parameters are greater than a third threshold) of other pixel sets, the reference lane line category may be determined as the lane line category of a lane line corresponding to the pixel set. If at least two pixel sets of the same semantic category have similar fitting parameters, the processing engine 112 may combine the at least two pixel sets. The processing engine 112 may determine the lane line category associated with the combined pixel set based at least on the binary information of each of the one or more pixels in the combined pixel set. More details regarding the determination of the lane line category may be found elsewhere in the present disclosure, for example, in the description in connection with FIG. 16 and/or FIG. 17.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 16:
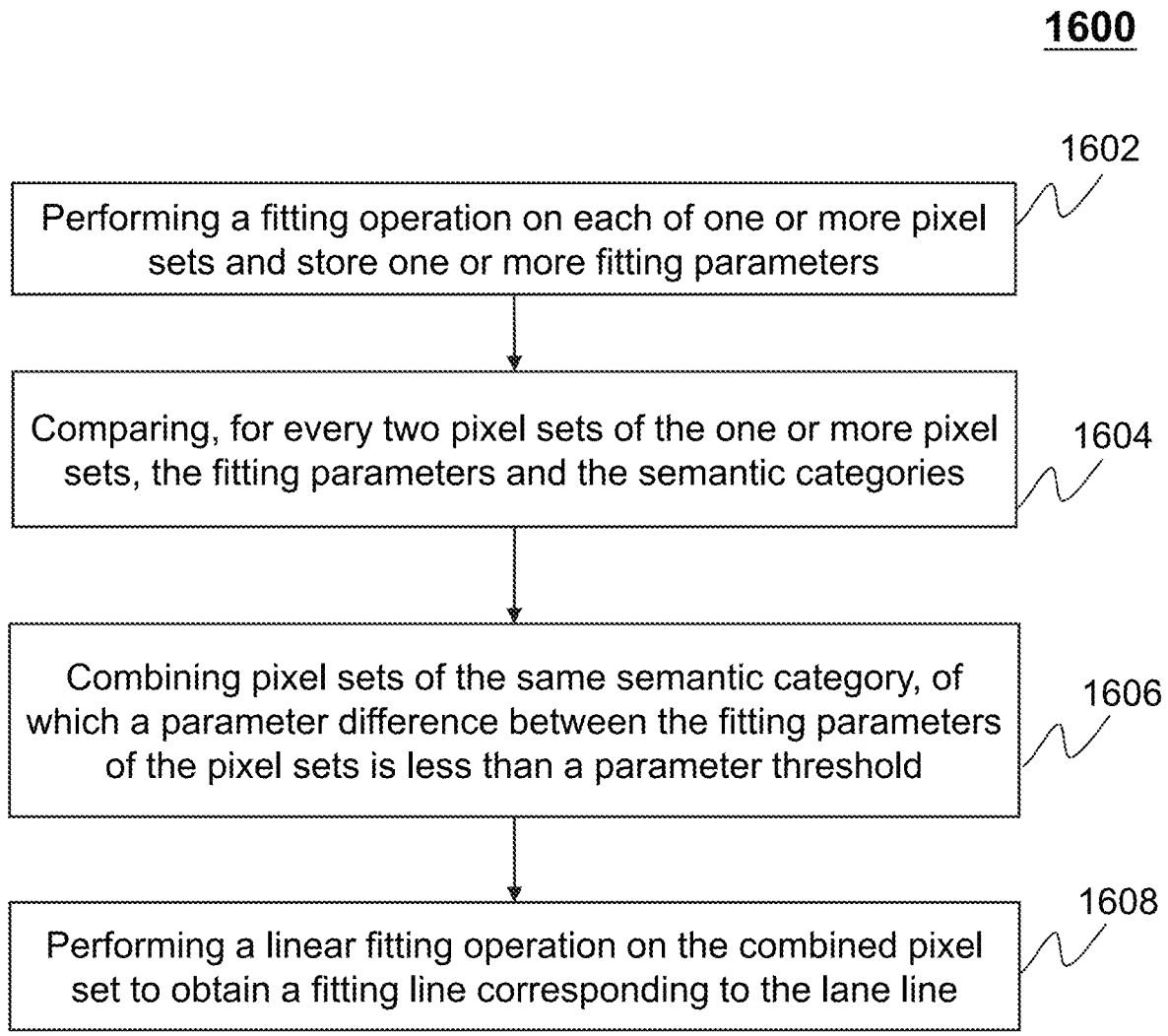
FIG. 16 is a flowchart illustrating an exemplary process for determining a fitting line corresponding to a combined pixel set according to some embodiments of the present disclosure.

FIG. 16 is a flowchart illustrating an exemplary process for determining a fitting line corresponding to a combined pixel set according to some embodiments of the present disclosure. In some embodiments, the process 1600 may be executed by the system 100. For example, the process 1600 may be implemented as a set of instructions (e.g., an application) stored in the storage (e.g., ROM 230 or RAM 240 of the computing device 200). The detection device 400, the processing engine 112 and/or modules in FIG. 4 may execute the set of instructions, and when executing the instructions, these devices and/or modules may be configured to perform the process 1600. The operations of the illustrated process 1600 presented below are intended to be illustrative. In some embodiments, the process 1600 may be accomplished with one or more additional operations not described, and/or without one or more of the operations discussed. Additionally, the order in which the operations of the process 1600 as illustrated in FIG. 16 and described below is not intended to be limiting.

In 1602, the processing engine 112 (e.g., the fitting module 640) may perform a fitting operation on each of the one or more pixel sets and store one or more fitting parameters. In some embodiments, due to an inappropriate setting for the values of the first threshold and/or the second thresholds, there may be a problem in which pixels of the same lane line are assigned to different pixel sets. Operation 1702 may be performed in a similar manner as described, for example, in connection with operation 708.

In 1604, the processing engine 112 (e.g., the lane line determination module 650) may compare, for every two pixel sets of the one or more pixel sets, the fitting parameters and the semantic categories. In some embodiments, the processing engine 112 may firstly determine whether there are at least two pixel sets corresponding to the same semantic category. In response to a determination that there are at least two pixel sets of the same semantic category in the one or more pixel sets, the processing engine 112 may further compare the fitting parameters of the at least two pixel sets corresponding to the same semantic category. For instance, the processing engine 112 may compare the intercept of the fitting lines of the at least two pixel sets corresponding to the same semantic category. In some embodiments, the processing engine 112 may determine a difference between fitting parameters (e.g., intercepts) corresponding to the at least two pixel sets and compare the difference with a parameter difference threshold. In response to a determination that the difference is less than or equal to the parameter difference threshold, the processing engine 112 may proceed to operation 1606.

In 1606, the processing engine 112 (e.g., the lane line determination module 650) may combine pixel sets of the same semantic category. A parameter difference between the fitting parameters of the pixel sets may be less than a parameter threshold.

In 1608, the processing engine 112 (e.g., the lane line determination module 650) may perform a linear fitting operation on the combined pixel set to obtain a fitting line corresponding to the lane line. In some embodiments, operation 1608 may be performed in a similar manner as described in connection with operation 708. In some embodiments, a portion of a lane line may be invisible in the image, for example, due to a vehicle that shelters the portion of the lane line. As a result, a single lane line may be identified as two lane lines corresponding to two pixel sets. The combination of similar pixel sets may decrease error caused by this problem and further improve the accuracy of lane line detection.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 17:
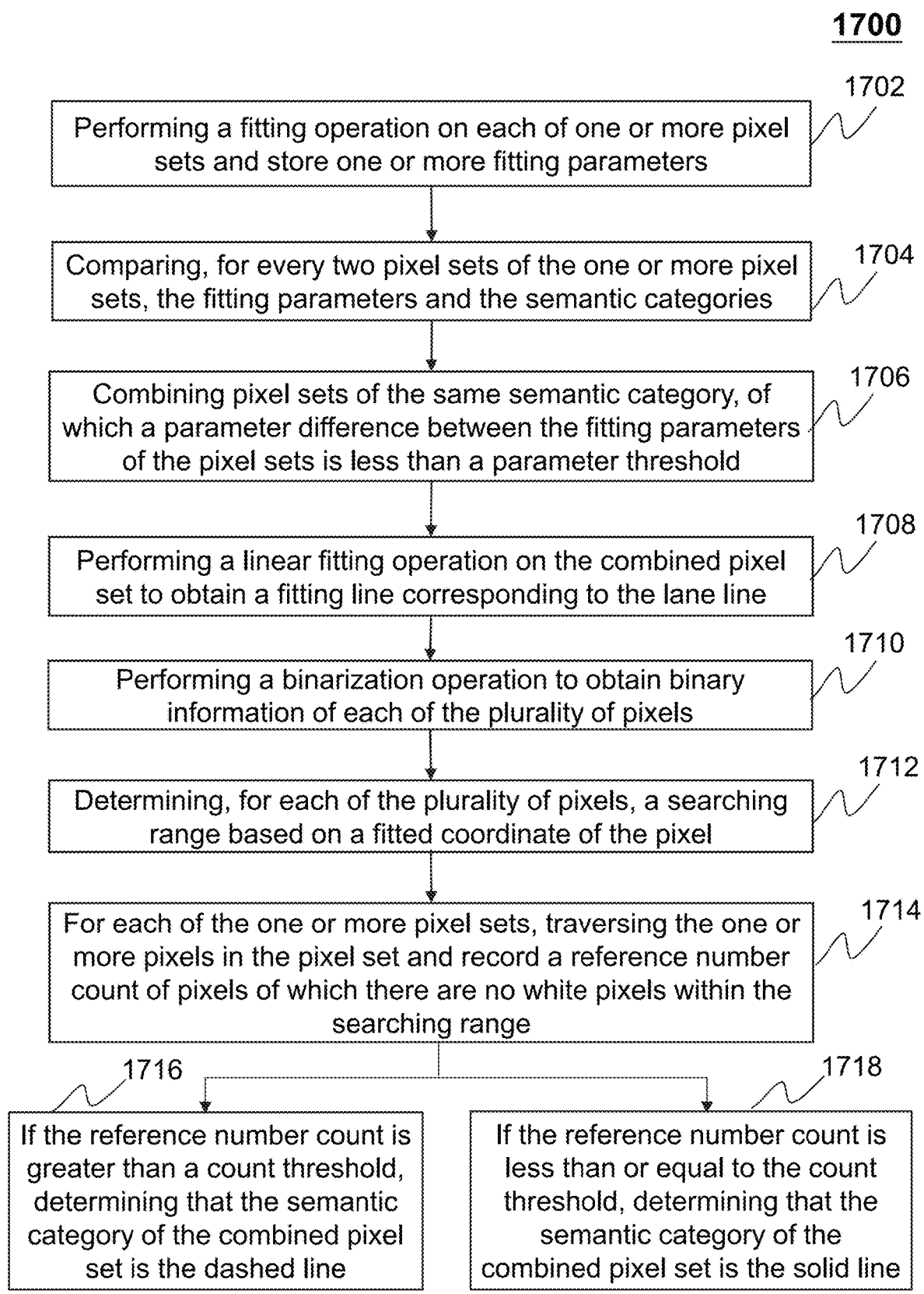
FIG. 17 is a flowchart illustrating an exemplary process for determining a semantic category of the combined pixel set according to some embodiments of the present disclosure.

FIG. 17 is a flowchart illustrating an exemplary process for determining a semantic category of the combined pixel set according to some embodiments of the present disclosure. In some embodiments, the process 1700 may be executed by the system 100. For example, the process 1700 may be implemented as a set of instructions (e.g., an application) stored in the storage (e.g., ROM 230 or RAM 240 of the computing device 200). The detection device 400, the processing engine 112 and/or modules in FIG. 4 may execute the set of instructions, and when executing the instructions, these devices and/or modules may be configured to perform the process 1700. The operations of the illustrated process 1700 presented below are intended to be illustrative. In some embodiments, the process 1700 may be accomplished with one or more additional operations not described, and/or without one or more of the operations discussed. Additionally, the order in which the operations of the process 1700 as illustrated in FIG. 17 and described below is not intended to be limiting.

In 1702, the processing engine 112 (e.g., the fitting module 640) may perform a fitting operation on each of the one or more pixel sets and store one or more fitting parameters.

In 1704, the processing engine 112 (e.g., the lane line determination module 650) may compare, for every two pixel sets of the one or more pixel sets, the fitting parameters and the semantic categories.

In 1706, the processing engine 112 (e.g., the lane line determination module 650) may combine pixel sets of the same semantic category, of which a parameter difference between the fitting parameters of the pixel sets is less than a parameter threshold.

In 1708, the processing engine 112 (e.g., the lane line determination module 650) may perform a linear fitting operation on the combined pixel set to obtain a fitting line corresponding to the lane line.

In some embodiments, operations 1702 to operations 1708 may be performed in a similar manner as described in connection with operations 1602-1608. In some embodiments, the trained segmentation network may identify whether a pixel corresponds to a lane line or the background and a reference lane line category corresponding to the lane line. For example, the semantic category of the lane line may include the dashed lane line, the solid lane line, and the background. In some embodiments, due to factors such as the light and the environment, a portion of a lane line may be determined as a dashed line, and another portion of the lane line may be determined as a solid line.

Figure 18:
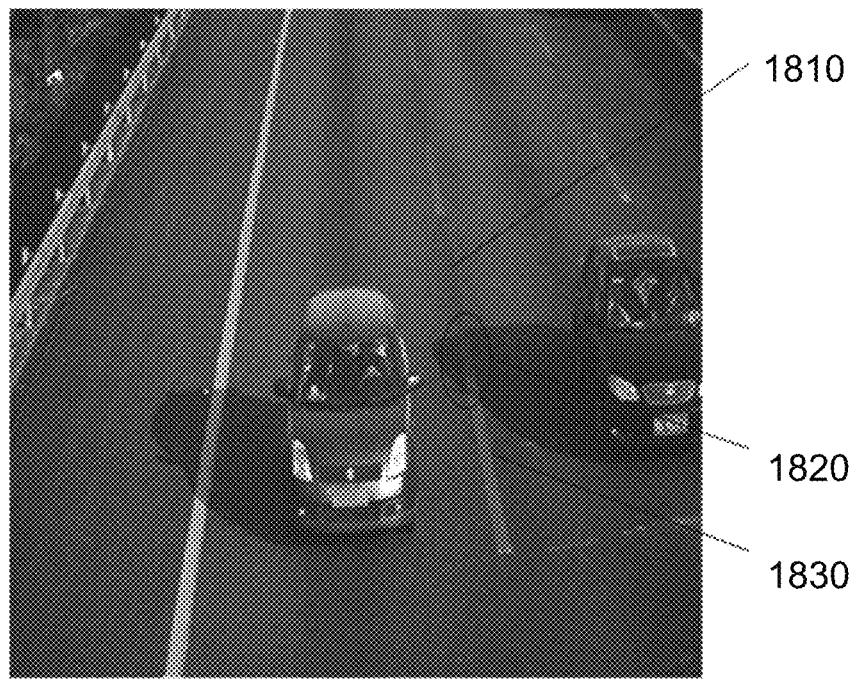
FIG. 18 is a schematic diagram illustrating exemplary pixels of erroneous semantic category according to some embodiments of the present disclosure.

FIG. 18 is a schematic diagram illustrating exemplary pixels of an erroneous semantic category according to some embodiments of the present disclosure. As shown in FIG. 18, pixels corresponding to a dashed line may be classified to generate a pixel set 1810 corresponding to a dashed lane line, a pixel set 1820 corresponding to a solid lane line, and a pixel set 1830 corresponding to a dashed lane line. Operations 1710 to 1718 may be performed to improve the accuracy of the lane line category corresponding to the lane line.

In 1710, the processing engine 112 (e.g., the lane line determination module 650) may perform a binarization operation to obtain binary information of each of the plurality of pixels. In some embodiments, the binarization operation may be performed on the same road image that is inputted to the trained semantic segmentation network. In some embodiments, the processing engine 112 may perform an edge extraction operation on the road image (e.g., by using the Sobel operator) before performing the binarization operation.

Figure 19:
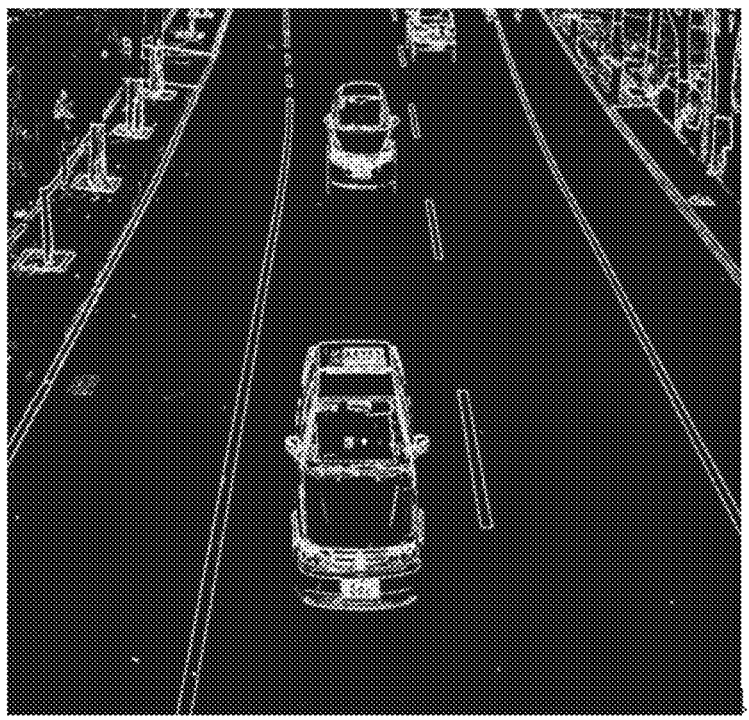
FIG. 19 is a schematic diagram illustrating an exemplary binary image according to some embodiments of the present disclosure.

FIG. 19 is a schematic diagram illustrating an exemplary binary image according to some embodiments of the present disclosure. For example, the pixel value may be determined as 0 or 255. The road image may present only two colors-black and white. Pixels of the white color may correspond to one or more edges in the binary image.

In 1712, the processing engine 112 (e.g., the lane line determination module 650) may determine, for each of the plurality of pixels, a searching range based on a fitted coordinate of the pixel. In some embodiments, the processing engine 112 may obtain an X-axis coordinate $\bar{x}$. The processing engine 112 may further determine a fitted y-axis coordinate y. The searching range may be determined as $(y_i-w, y_i+w)$, where w denotes a parameter related to a width of the lane line corresponding to the pixel set. In some embodiments, the width of different portions of the lane line may look different in the road image due to factors such as distortion caused by the camera. The processing engine 112 may determine the maximum width of the lane line in the road image and determine the maximum width as the value of w.

In 1714, the processing engine 112 (e.g., the lane line determination module 650) may traverse, for each of the one or more pixel sets, the one or more pixels in the pixel set and record a reference number count of reference pixels. If there are no white pixels within the searching range of each of the one or more pixels in a pixel set, the pixel may be determined as a reference pixel. Pixels corresponding to at least a portion of an edge may be referred to as "edge pixels". As used herein, the white pixels are a type of edge pixels whose pixel values are determined as 255. For instance, if there are no white pixels within the searching range of a pixel, the pixel may be determined as a reference pixel, and a count value of the pixel may be increased by 1. The processing engine 112 may determine the reference number count of pixels based on a sum of the count value corresponding to each pixel in the pixel set.

In 1716, if the reference number count is greater than a count threshold, the processing engine 112 (e.g., the lane line determination module 650) may determine that the semantic category of the combined pixel set is the dashed line. Merely by way of example, the count threshold may be 5, 10, 15, 30, or the like. The count threshold may be a default value of the system 100 and may be adjustable.

In 1718, if the reference number count is less than or equal to the count threshold, the processing engine 112 (e.g., the lane line determination module 650) may determine that the semantic category of the combined pixel set is the solid line. In some embodiments, operations 1710 to 1718 may be performed to correct an error that may occur in the determination of the semantic category of the plurality of pixels determined by the trained segmentation network. Thus, the accuracy of the lane line category corresponding to the one or more lane lines corresponding to the one or more pixel sets may be improved.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A method for lane detection, implemented on a computing device including at least one processor and at least one storage medium, the method comprising:

obtaining an image;
determining, for each of a plurality of pixels in the image, a semantic category using a trained semantic segmentation network;
determining one or more pixel sets based on the plurality of pixels according to a predetermined rule, wherein each of the one or more pixel sets includes one or more pixels of a same semantic category; and
for each of the one or more pixel sets,
    determining whether there are one or more erroneous pixels that satisfy a predetermined condition by performing an iterative fitting operation on the one or more pixels in the pixel set, including:
        in each iteration of the iterative fitting operation, for each of the one or more pixels in the pixel set,
            determining, based on an estimated fitting line associated with the one or more pixels in the pixel set, a fitted coordinate associated with the pixel;
            determining a first difference between the fitted coordinate and an actual coordinate associated with the pixel; and
            in response to a determination that the first difference is greater than a first threshold, determining that the pixel is an erroneous pixel;
    in response to a determination that there are one or more erroneous pixels, removing the one or more erroneous pixels from the pixel set to obtain a fitting line corresponding to a lane line, and
    determining a position of the lane line based on the fitting line.

2. The method of claim 1, wherein the determining whether there are one or more erroneous pixels that satisfy a predetermined condition further includes:
    in the each iteration,
        performing a fitting operation on coordinates of the one or more pixels in the pixel set to obtain the estimated fitting line; and
        determining whether there are one or more erroneous pixels that satisfy the predetermined condition.

3. The method of claim 1, wherein a termination criterion for the iterative fitting operation is that for each of one or more fitting parameters of the fitting line, a second difference between the fitting parameters estimated in two consecutive iterations is less than or equal to a second threshold.

4. The method of claim 1, further comprising:
    performing a binarization operation to obtain binary information of each of the plurality of pixels; and
    for each of the one or more pixel sets,
        determining, based at least on the fitting line and the binary information of the one or more pixels in the pixel set, a lane line category of the lane line.

5. The method of claim 1, wherein the trained semantic segmentation network includes one or more convolutional layers and one or more deconvolutional layers, the one or more convolutional layers being configured for a depth-wise separable convolution.

6. A method for lane detection, implemented on a computing device including at least one processor and at least one storage medium, the method comprising:
    obtaining an image;
    determining, for each of a plurality of pixels in the image, a semantic category using a trained semantic segmentation network;
    determining one or more pixel sets based on the plurality of pixels according to a predetermined rule, wherein each of the one or more pixel sets includes one or more pixels of a same semantic category;
    performing a binarization operation to obtain binary information of each of the plurality of pixels; and
    for each of the one or more pixel sets,
        performing a fitting operation on the one or more pixels in the pixel set to obtain a fitting line corresponding to a lane line;
        determining a position of the lane line based on the fitting line; and
        determining, based at least on the fitting line and the binary information of the one or more pixels in the pixel set, a lane line category of the lane line, including:
            for each of the one or more pixels in the pixel set, determining a fitted coordinate of the pixel;
            determining a searching range for the pixel based on the fitted coordinate and a lane line width; and
            determining the lane line category of the lane line based on one or more searching ranges corresponding to the one or more pixels in the pixel set and the binary information of the one or more pixels in the pixel set.

7. The method of claim 6, wherein the performing a binarization operation to obtain binary information of each of the plurality of pixels includes:
    performing an edge extraction operation on the plurality of pixels in the image to obtain edge information associated with each of the plurality of pixels; and
    determining, based on the edge information, the binary information of each of the plurality of pixels.

8. The method of claim 6, wherein the determining the lane line category of the lane line based on one or more searching ranges corresponding to the one or more pixels in the pixel set and the binary information of the one or more pixels in the pixel set includes:
    determining a reference number count of reference pixels, wherein there are no edge pixels near each of the reference pixels within the searching range; and
    determining the lane line category of the lane line by comparing the reference number count of pixels and a count threshold.

9. The method of claim 8, wherein the determining the lane line category of the lane line by comparing the reference number count of pixels and a count threshold includes:
    in response to a determination that the reference number count of reference pixels is greater than the count threshold, determining that the lane line category of the lane line is a dashed line; and
    in response to a determination that the reference number count of pixels is less than or equal to the count threshold, determining that the lane line category of the lane line is a solid line.

10. The method of claim 6, further comprising:
    determining whether there are at least two pixel sets of the same semantic category in the one or more pixel sets; and
    in response to a determination that there are at least two pixel sets of the same semantic category in the one or more pixel sets,
        determining a difference between fitting parameters of the at least two pixel sets;
        comparing the difference with a parameter difference threshold; and in response to a determination that the difference is less than or equal to the parameter difference threshold, generating a combined pixel set based on the at least two pixel sets.

11. The method of claim 6, wherein the fitting operation is an iterative fitting operation, and the method further comprises:
for each of the one or more pixel sets,
determining whether there are one or more erroneous pixels that satisfy a predetermined condition; and
in response to a determination that there are one or more erroneous pixels, removing the one or more erroneous pixels from the pixel set to obtain the fitting line.

12. The method of claim 6, wherein the trained semantic segmentation network includes one or more convolutional layers and one or more deconvolutional layers, the one or more convolutional layers being configured for a depth-wise separable convolution.

13. A method for lane detection, implemented on a computing device including at least one processor and at least one storage medium, the method comprising:
obtaining an image;
determining, for each of a plurality of pixels in the image, a semantic category using a trained semantic segmentation network, wherein the trained semantic segmentation network include one or more convolutional layers and one or more deconvolutional layers, the one or more convolutional layers being configured for a depth-wise separable convolution;
determining one or more pixel sets based on the plurality of pixels according to a predetermined rule, wherein each of the one or more pixel sets includes one or more pixels of a same semantic category;
determining whether there are at least two pixel sets of the same semantic category in the one or more pixel sets;
in response to a determination that there are at least two pixel sets of the same semantic category in the one or more pixel sets,
determining a difference between fitting parameters of the at least two pixel sets;
comparing the difference with a parameter difference threshold; and
in response to a determination that the difference is less than or equal to the parameter difference threshold, generating a combined pixel set based on the at least two pixel sets; and
for each of the one or more pixel sets,
performing a fitting operation on the one or more pixels in the pixel set to obtain a fitting line corresponding to a lane line; and
determining a position of the lane line based on the fitting line.

14. The method of claim 13, wherein at least a portion of the one or more convolutional layers and at least a portion of the one or more deconvolutional layers are connected via skip connections.

15. The method of claim 13, wherein the trained semantic segmentation network is constructed based on a Mobilenet and a fully convolutional network (FCN).

16. The method of claim 13, wherein the predetermined rule includes:
for each of the plurality of pixels in the image,
determining whether there are one or more reference pixel sets that have the same semantic category as the pixel;
in response to a determination that there are no reference pixel sets that have the same semantic category as the pixel, generating a new reference pixel set and adding the pixel into the new reference pixel set;
in response to a determination that there are one or more reference pixel sets that have the same semantic category as the pixel,
determining, a minimum distance from one or more distances between the pixel and the one or more reference pixel sets; and
comparing the minimum distance with a distance threshold;
in response to a determination that the minimum distance is less than the distance threshold, adding the pixel into a reference pixel set corresponding to the minimum distance; and
in response to a determination that the minimum distance is greater than or equal to the distance threshold, generating a new reference pixel set and adding the pixel into the new reference pixel set.

17. The method of claim 13, wherein the fitting operation is an iterative fitting operation, and the method further comprises:
for each of the one or more pixel sets,
determining whether there are one or more erroneous pixels that satisfy a predetermined condition; and
in response to a determination that there are one or more erroneous pixels, removing the one or more erroneous pixels from the pixel set to obtain the fitting line.

18. The method of claim 13, further comprising:
performing a binarization operation to obtain binary information of each of the plurality of pixels, and
for each of the one or more pixel sets,
determining, based at least on the fitting line and the binary information of the one or more pixels in the pixel set, a lane line category of the lane line.

* * * * *